(12) United States Patent
Hayashi

(10) Patent No.: US 7,457,419 B2
(45) Date of Patent: Nov. 25, 2008

(54) INFORMATION PROCESSING METHOD AND APPARATUS FOR ENCRYPTING ENCODED DATA

(75) Inventor: Junichi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 709 days.

(21) Appl. No.: 10/754,523

(22) Filed: Jan. 12, 2004

(65) Prior Publication Data
US 2004/0141613 A1 Jul. 22, 2004

(30) Foreign Application Priority Data
Jan. 14, 2003 (JP) ............................. 2003-006373
Dec. 10, 2003 (JP) ............................. 2003-412222

(51) Int. Cl.
*H04L 9/00* (2006.01)
(52) U.S. Cl. .................. 380/281; 380/277; 380/42; 380/44; 380/45; 380/217
(58) Field of Classification Search .................. 380/281
See application file for complete search history.

(56) References Cited

U.S. PATENT DOCUMENTS

| | | | |
|---|---|---|---|
| 5,321,776 A * | 6/1994 | Shapiro ...................... | 382/240 |
| 5,619,025 A * | 4/1997 | Hickman et al. ............. | 235/454 |
| 6,434,253 B1 | 8/2002 | Hayashie et al. ............ | 382/100 |
| 6,456,985 B1 * | 9/2002 | Ohtsuka ...................... | 705/51 |
| 2003/0113027 A1 * | 6/2003 | Chan et al. .................. | 382/240 |
| 2003/0190042 A1 | 10/2003 | Tagashira et al. ............. | 380/45 |

FOREIGN PATENT DOCUMENTS

JP          11098487 A  *  4/1999
WO    WO 2004/004198 A1    1/2004

OTHER PUBLICATIONS

Machine Translation of JP11098487.*
Marcellin, M.W.; Gormish, M.J.; Bilgin, A.; Boliek, M.P., "An overview of JPEG-2000," Data Compression Conference, 2000. Proceedings. DCC 2000, Publication: 2000.*

* cited by examiner

*Primary Examiner*—KimYen Vu
*Assistant Examiner*—Yogesh Paliwal
(74) *Attorney, Agent, or Firm*—Fitzpatrick, Cella, Harper & Scinto

(57) ABSTRACT

The present invention makes it possible to encrypt a portion of a tile image to be subject to wavelet transformation at or above a desired resolution level without the need to manage multiple encryption keys. The invention divides the sub-bands generated with each wavelet transformation into a plurality of precincts, treats aggregations of encrypted data of precincts of the same phase of sub-bands of the same layer as a tile part, and defines a tree structure in which tile parts having higher frequency encrypted data are positioned at higher level nodes. An encryption unit then generates encryption key information for tile parts of the highest level node based on route key information generated from encrypted data for the entire tile, and generates encryption key information for encrypting tile parts other than those of the highest node by unidirectional transformation of encryption key information for tile parts of higher level nodes.

7 Claims, 21 Drawing Sheets

TWO WAVELET TRANSFORMATIONS

FIG. 6A

| TILE PART INDEX | ACCESS CONTROL METHOD |
|---|---|
| 0 | 1 |
| 1 | 1 |
| 2 | 1 |
| 3 | 0 |
| 4 | 1 |
| 5 | 1 |
| 6 | 1 |
| 7 | 0 |
| 8 | 1 |
| 9 | 1 |
| 10 | 1 |
| 11 | 0 |

FIG. 6B

| TILE PART INDEX | ACCESS CONTROL METHOD |
|---|---|
| 0 | 0 |
| 1 | 0 |
| 2 | 1 |
| 3 | 0 |
| 4 | 0 |
| 5 | 1 |
| 6 | 0 |
| 7 | 0 |
| 8 | 1 |
| 9 | 0 |
| 10 | 0 |
| 11 | 1 |

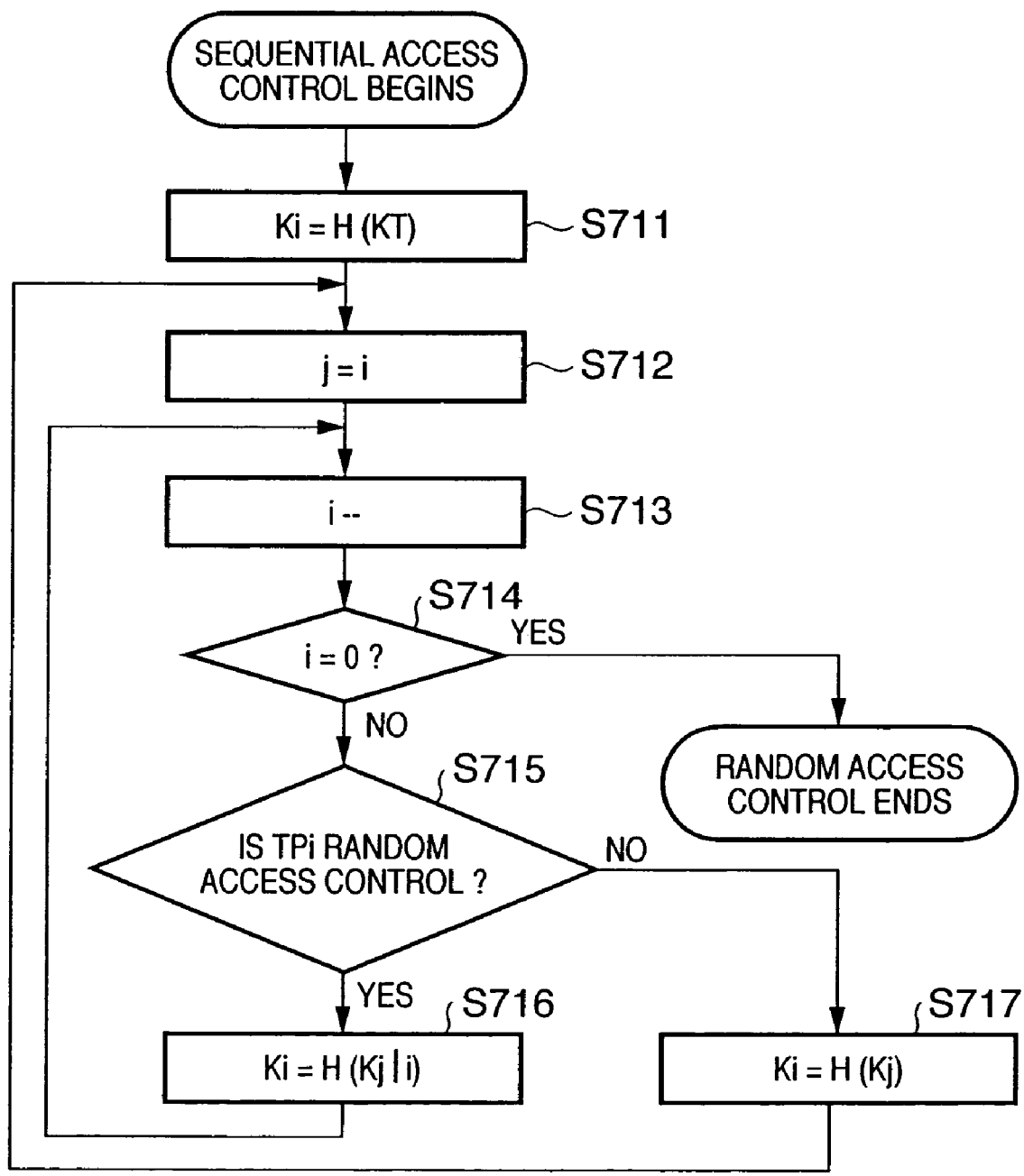

FIG. 8

| FIRST ACCESS KEY VALUE |
| --- |
| INDEX CORRESPONDING TO FIRST ACCESS KEY VALUE |
| SECOND ACCESS KEY VALUE |
| INDEX CORRESPONDING TO SECOND ACCESS KEY VALUE |
| ⋮ |
| nTH ACCESS KEY VALUE |
| INDEX CORRESPONDING TO nTH ACCESS KEY VALUE |

F I G. 10A
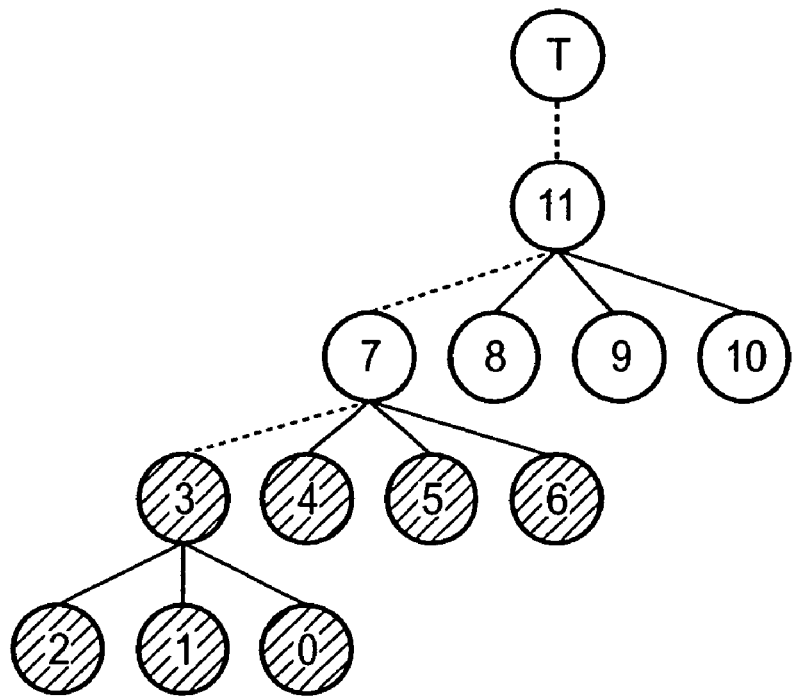
F I G. 10B
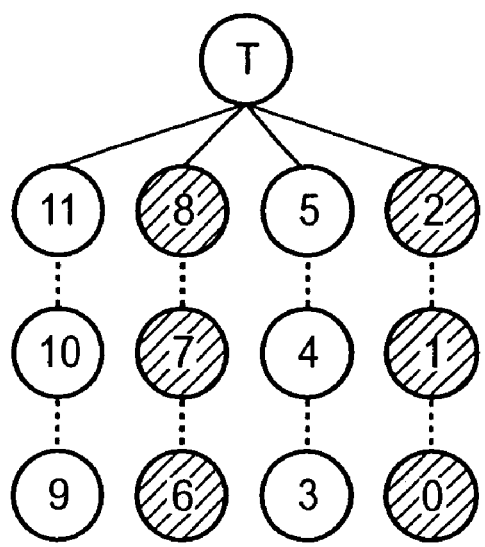

FIG. 15

| TILE PART INDEX | TILE PART KEY |
|---|---|
| 0 | K0 |
| 1 | K1 |
| 2 | K2 |
| 3 | K3 |
| 4 | K4 |
| 5 | K5 |
| 6 | K6 |
| 7 | K7 |
| 8 | K8 |
| 9 | K9 |
| 10 | K10 |
| 11 | K11 |

INFORMATION PROCESSING METHOD AND APPARATUS FOR ENCRYPTING ENCODED DATA

FIELD OF THE INVENTION

The present invention relates to a technique for encrypting compressed/encoded digital image data.

BACKGROUND OF THE INVENTION

Conventionally, in order to encipher and transmit image data, the image data as a whole is encrypted or scrambled. This technique involves pre-encrypting the image data as a whole using a single encryption key, so that the data can only be correctly decrypted by a decryption key corresponding to the encryption key.

However, with image data having a layered structure, it is desirable to encrypt the image data using a different encryption key for each layer of that layered structure instead of encrypting the image data as a whole, in order to control the ability to reproduce image data that corresponds to that layered structure. Moreover, since the image data is composed of a plurality of tiles, it is desirable to encrypt the data using a different encryption key for each tile, in order to control the ability to reproduce each tile. Furthermore, where the image data is composed of a plurality of tiles and each individual tile has a layered structure, a different encryption key is used to encrypt each layer in each tile in order to control the ability to reproduce the image data that corresponds to the tiles and the layered structure.

By thus encrypting the image data using a different encryption key for each tile and each layer as described above, it is possible to control the reproduction of the image data with each tile and each layer.

However, where the encoded tile data is composed of a plurality of partially encoded pieces of data, and each individual partially encoded piece of data is encrypted using a different encryption key, the layered structure of the partially encoded pieces of data and the decryption key for its decryption must be the same, which inevitably complicates key information management.

Moreover, it is obvious that the image data cannot be properly decrypted if the keys for each partially encoded pieces of data are not properly managed.

SUMMARY OF THE INVENTION

Accordingly, the present invention has been conceived in light of the foregoing considerations, and provides a technique, in which the above-described problems of the conventional art are solved. More specifically, the present invention provides a technique that makes it possible to encrypt a portion of those tiles to undergo wavelet transformation to a level exceeding the desired resolution, thereby eliminating the need to manage a plurality of encryption keys.

The above-described object of the present invention is achieved, for example, by an information processing method of the present invention having the following steps, that is, the information processing method for encrypting encoded data generated by multi-stage wavelet transformation of image data, the method comprising the steps of: dividing sub-bands of each level in the encoded data into a plurality of precincts; defining an aggregation of encoded data of precincts of the same phase of sub-bands of the same level as one tile part; defining a tree structure in which nodes corresponding to tile parts are positioned such that at least one tile part corresponding to a high-frequency component is higher than a low-frequency component; generating an encryption key for a highest node on the basis of the image data; generating encryption keys representing the levels in order from the highest level to the lowest level by calculating the highest encryption key using a unidirectional transformation process; and encrypting a given tile part based on the tile part and an encryption key representing the level to which the tile part belongs.

Other objects, features, effects and advantages of the present invention will be apparent from the following description, taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which:

FIGS. 6A and 6B are diagrams illustrating encrypted tile part data according to one embodiment of the present invention;

FIGS. 7A, 7B and 7C are flow charts showing steps in a process of generating a key matrix in the encryption processing unit according to one embodiment of the present invention;

FIG. 8 is a diagram showing the format of an access key according to one embodiment of the present invention;

FIGS. 10A and 10B are diagrams illustrating access control according to one embodiment of the present invention;

FIG. 15 is a diagram showing one example of a key matrix according to one embodiment of the present invention.

DETAILED DESCRIPTION OF THE PREFERRED EMBODIMENTS

Preferred embodiments of the present invention are described in detail in accordance with the accompanying drawings.

Figure 14:
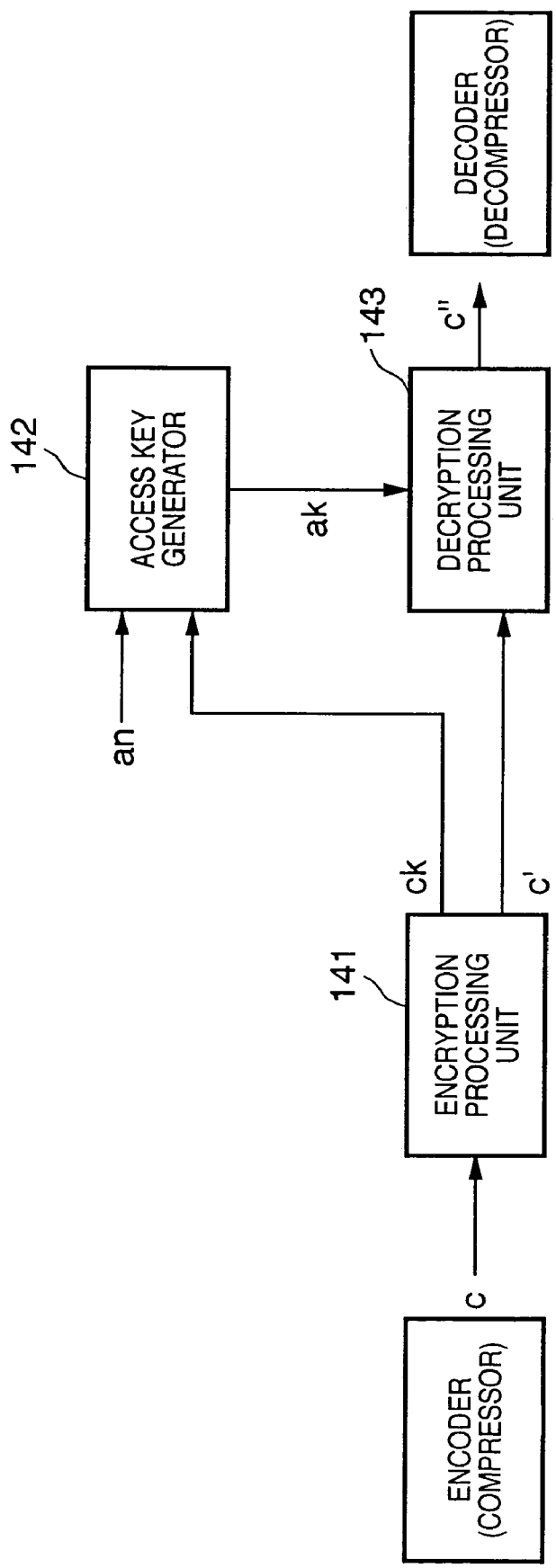
FIG. 14 is a diagram showing the overall structure of the system according to one embodiment of the present invention.

First, a description is given of the overall system according to one embodiment of the present invention, using FIG. 14.

As shown in FIG. 14, the system according to the present embodiment comprises an encryption processing unit 141(or encryption device), an access key generator 142(or access key generating device) and a decryption processing unit 143(or decryption device). As shown in FIG. 14, an encoder(compression unit) which compression encodes an image data is located at the front of the system and a decoder which decodes a code stream encoded according to the embodiment is located at the end of the system. According to the embodiment, assuming that JPEG 2000 algorithm (to be described in detail below) is applied to encoding/decoding algorithm.

A code stream c encoded by the encoder unit is input to the encryption processing unit 141, which outputs from the code stream c both a contents key ck and an encrypted code stream c'. The access key generator 142, to which the contents key ck and an access level "an" are input, generates an access key ak. The access key ak and the encrypted code stream c' are then input to the decryption processing unit 143, which then outputs a decrypted code stream c". Where c=c", the decryption processing unit 143 can reproduces the encoded image data (coded image data c) as it was prior to encryption.

In the present embodiment, the access key generator 142 and the decryption processing unit 143 are both tamper-proof. For example, the encryption processing unit 141 may be an apparatus that encrypts images photographed by a digital camera and uploads the images to an internet web server or FTP server, the access key generator 142 may be implemented by a server that issues an access key, and the decryption processing unit 143 may be implemented by a network client that downloads the encrypted image data.

(Description of Image Data Code Stream)

First, a description is given of the stream of encoded data that is input to the encryption processing unit 141 in the present embodiment.

The code stream of the present embodiment is the encoded sequence formed at the time the image data is compression coded. In the present embodiment, an encoded sequence that is encoded using a compression coding method that is standardized in ISO/IEC JTC1/SC29/WG1 14492-1 and typically called JPEG2000, is herein called a code stream.

In the JPEG2000 compression coding method, an image is first divided into a plurality of rectangular regions, with each of the rectangular regions being independently encoded by wavelet transformation. These rectangular regions are called tiles. The code stream that corresponds to the encoded tile can be further divided into at least one or more areas called tile parts.

Figure 1:
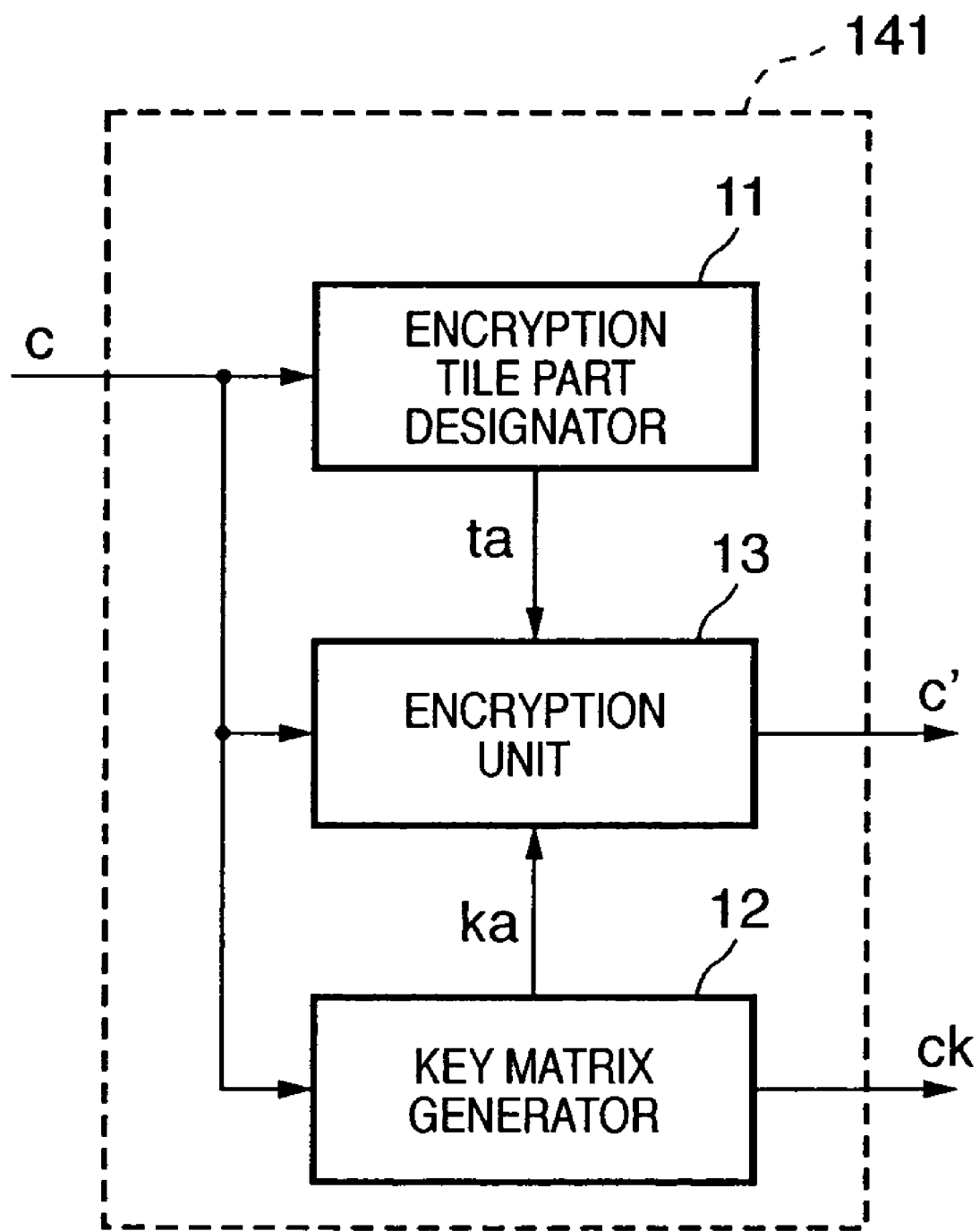
FIG. 1 is a block diagram of an encryption processing unit according to one embodiment of the present invention.
Figure 2:
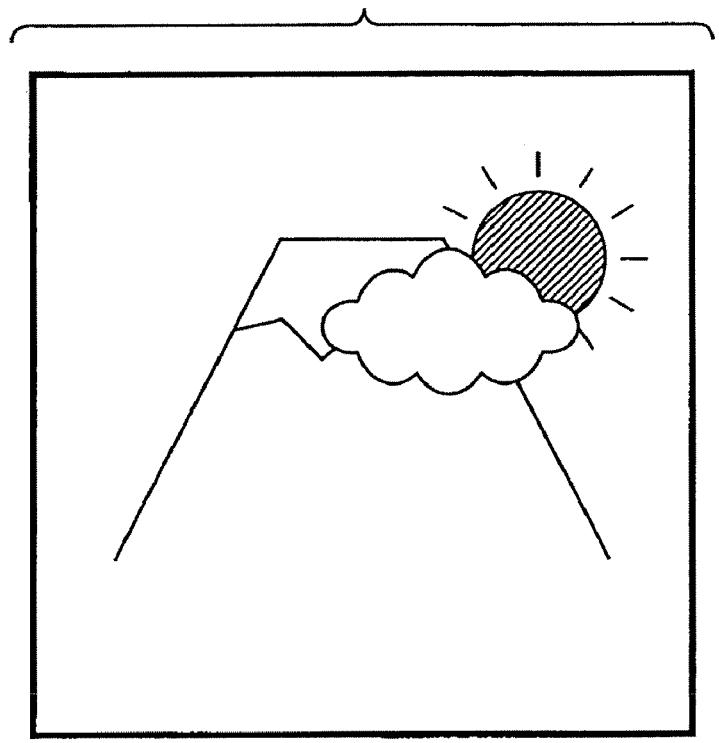
FIG. 2 is a diagram illustrating wavelet transform and precinct according to one embodiment of the present invention.
Figure 2:
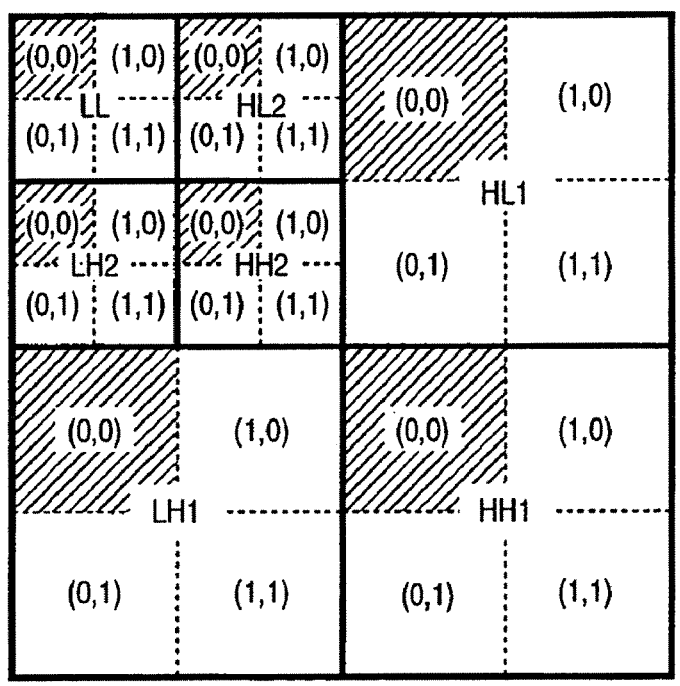

A brief description is now given of tile parts, using FIG. 2.

FIG. 2 is a diagram illustrating a wavelet transform in which the original image has undergone two wavelet transformations. In the example shown in FIG. 2, the tile size is the same as that of the original image.

As is well known, the component coefficients obtained by the first wavelet transformation of a single tile are LL1, LH1, HL1 and HH1. Of these, {LH1+HL1+HH1} is treated as a single part. The second wavelet transformation is carried out on the LL1, this time generating LL2, LH2, HL2 and HH2, of which {LH2+HL2+HH2} is also treated as a single tile part.

Since only one of the remaining lowest-frequency components exists, it is often expressed not as LL2 but as simply LL.

Although not shown in the diagram, if a further wavelet transformation (i.e., a third wavelet transformation) were to be carried out on LL2, the (LH3+HL3+HH3) result so generated would be treated as a tile part, with the remaining LL3 treated as a separate tile part. Below, it is possible to carry out the required number of wavelet transformations.

Thereafter each component for each frequency is quantified and entropy encoded. The tile parts described above correspond the encoded data of the aggregation of the frequency components generated with each wavelet transform, and the foregoing explains the reason why a single tile code is composed of a plurality of tile part codes.

It should be noted that, with JPEG2000, there is no rule that a fixed number of wavelet transformations should be performed on all tiles. In other words, the number of wavelet transformations performed may vary with every tile.

The present applicant has previously proposed establishing encryption keys for each level of resolution in tile parts like those described above. For example, by not encrypting the lowest-frequency tiles (and thereby permitting the image to be reproduced at the lowest resolution) but by encrypting tile parts having any higher resolution, without the relevant key information it would either be impossible to decode anything higher than the lowest resolution or, if decoded, the resulting reproduced image would be noisy.

By contrast, in the present embodiment, the tiles are divided into a plurality of precincts and each precinct is encrypted separately independently. In other words, the present embodiment determines whether or not to encrypt at the level of the precinct.

A precinct represents a unit of group consisted of areas of the relative same position in two-dimensional space among each frequency of each resolution level when the wavelet transformation is performed a plurality of times. The size of the precincts can be separately determined for each resolution level.

Figure 3A:
FIGS. 3A, 3B and 3C are diagrams showing examples of decryption at each resolution of encrypted encoded data according to one embodiment of the present invention.
Figure 3B:
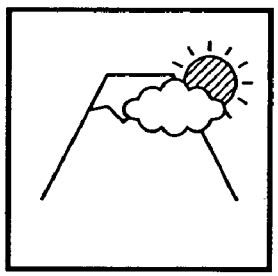
Figure 3C:
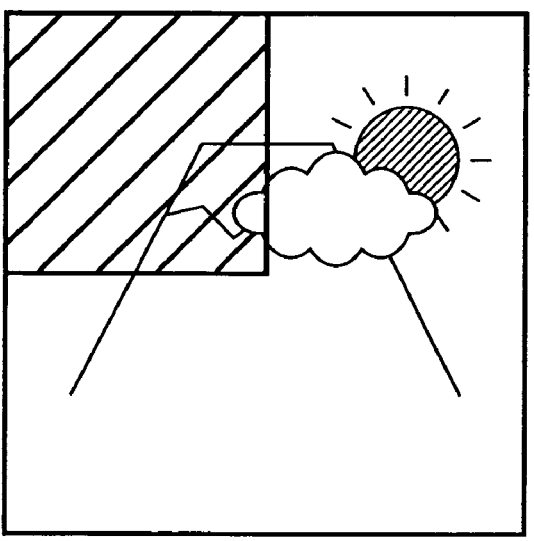

For simplicity of explanation with regard to a precinct, and similar to the example illustrated in FIG. 2 described above, a description is now given of a case in which original image data is subjected to two wavelet transformations, using FIGS. 3A, 3B and 3C.

FIGS. 3A, 3B and 3C are diagrams showing examples of decryption at each resolution of encrypted encoded data according to one embodiment of the present invention. FIG. 3A shows a lowest-resolution image, in which the code stream used for decoding is not encrypted. FIG. 3B shows the results of decoding a higher-resolution image than that shown in FIG. 3A, although here, too, the encoded data used for decoding is not encrypted. FIG. 3C shows an example of an image having the highest resolution, but for which the code data necessary to decode a portion of the two-dimensional tiles (shown at the upper left corner of the figure) is encrypted.

In order to implement the relevant process, it is necessary to define the tile part using the precinct of the present embodiment. A description thereof is hereby given below.

A brief description with regard to the precinct is given using FIG. 2. The bottom of FIG. 2 shows a wavelet transform area in which a single tile has been wavelet-divided twice (that is, the tile has three resolution levels). Here, the frequency component areas (i.e., sub-bands) at each resolution level are divided into 2×2 sub-areas, with the respective sub-areas shown as a set of coordinates ranging from (0,0) to (1,1). These sub-areas are called precincts.

In encoding/decoding algorithm of JPEG2000, although in essence the size of the precinct can be set separately according to the level of resolution, in the present embodiment each precinct at each resolution level is divided so as to show the same spatial position. For example, in FIG. 2, the precincts of the resolution levels all express the same spatial area, shown as a grid.

In encoding/decoding algorithm of JPEG2000, the entire image is divided into a plurality of tiles and so a spatially independently reproducible code stream can be generated, but since the tiles are encoded independently, the boundaries between tiles may be distorted, which is undesirable.

By contrast, in the present embodiment, a single image is not divided into a plurality of tiles. Instead, the tile size is made to be the same as the image size as shown in FIG. 2, and handled as a single tile (i.e., the number of wavelet transformations increases is increased).

(The Encryption Processing Unit)

In the present embodiment, the code stream c is already compression coded by a compression order determined by the desired access control method and by tile part.

For example, at each individual resolution level, 2×2(=4) precincts are set in order to control the access for four precincts.

In this case, the tile is compression coded so as to obtain a progression order that gives priority to the precinct, and moreover, each of the tile parts corresponding to each individual resolution level are further divided into four further tile parts (corresponding to the precincts at each resolution level).

Figure 4A:
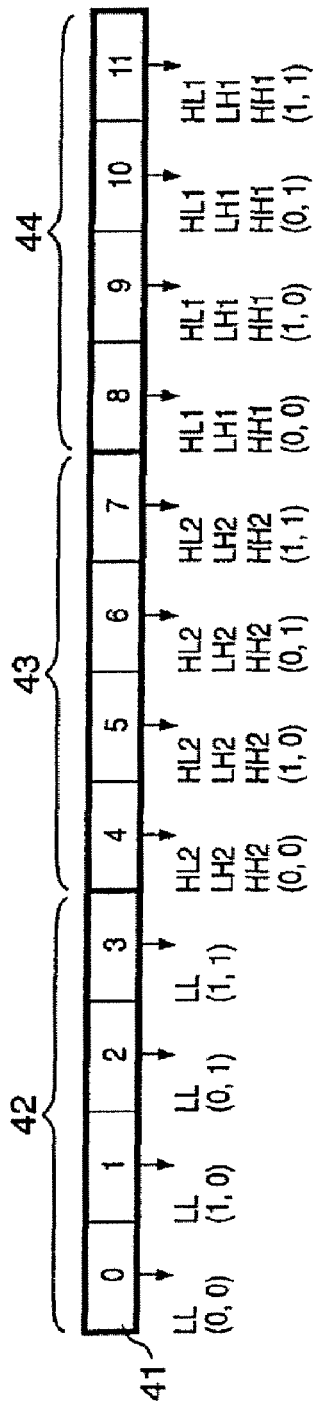
FIGS. 4A, 4B and 4C are diagrams showing arrangements of a tile part according to one embodiment of the present invention.

The foregoing example is described using FIG. 4A. FIG. 4A shows a code stream in which a single tile is composed of 12 tile parts(precincts). In the diagram, numerals 0 to 11 are indexes for designating the tile part (hereinafter referred to as tile part indexes).

In FIG. 4A, reference numeral 42 corresponds to a resolution level composed of tile parts 0-3, and as can be seen from reference to FIG. 2 described above contains encoded data LL from coordinates (0,0) to (1,1), that is, the bit stream corresponding to the lowest resolution level. Similarly, reference numerals 43 and 44 also corresponds to each resolution level composed of four tile parts 4-7 and 8-11, respectively, containing bit streams corresponding to intermediate and highest levels of resolution, respectively. Furthermore, each resolution level is composed of four tile parts, corresponding to precincts.

It should be noted that, although in the example shown here the sub-bands ate made into 2×2 precincts when wavelet transformation is performed, in fact the sub-bands may instead be divided into nine precincts (3×3), with access control geared to each individual precinct. In such an arrangement, the tiles are compression coded so as to obtain a progression order that gives priority to the precincts, and moreover, the tile is divided into nine tile parts, with each tile part corresponding to an individual precinct. In principle, tiles may be divided into n×n precincts.

In a stream like that shown in FIG. 4A, data represented by a tile part index "8" may be encrypted when setting encryption levels like shown in FIG. 3C.

It should be noted that access control for each precinct may be geared to each of the three resolution levels.

In such an arrangement, in unit of precincts, the tiles may be compression coded so as to obtain a progression order such that tile parts from the lowest resolution to the highest resolution are arranged successively.

Figure 4B:
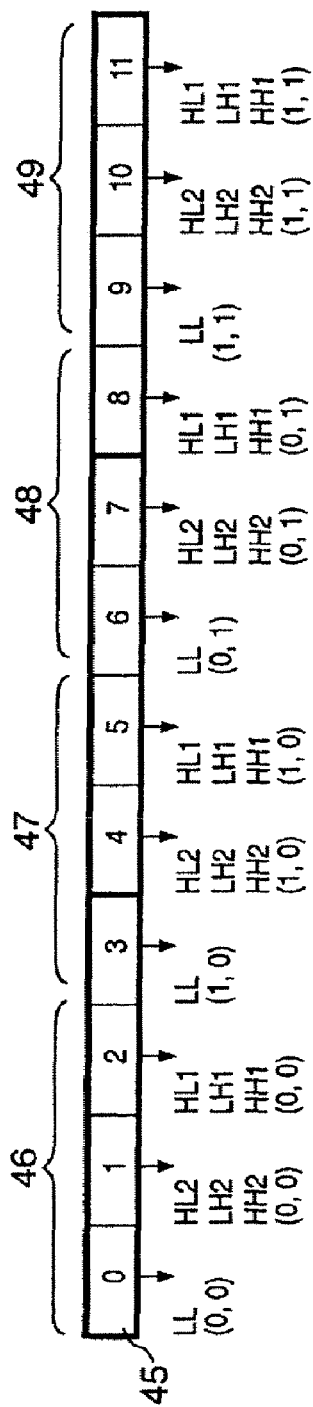

FIG. 4B shows a code stream that a tile is composed of 12 tile parts. Numerals 0-11 represent the tile part indexes. Reference numeral 46 represented data composed of tile parts 0-2, containing a bit stream corresponding to the upper left precinct (0,0) of the low, intermediate and high sub-bands in the tile. Similarly, reference numerals 47, 48 and 49 represent data composed of tile parts 3-5, 6-8 and 9-11, respectively, containing bit streams corresponding to the upper right (1,0), lower left (0,1) and lower right (1,1) precincts, respectively.

In the stream shown in FIG. 4B, when carrying out the encryption shown in FIG. 3C described above, the tile index "2" may be encrypted.

Figure 4C:
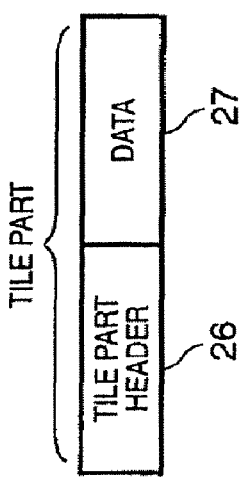

It should be noted that, in both FIGS. 4A and 4B, the tile parts have a structure like that shown in FIG. 4C. In FIG. 4C, reference numeral 26 denotes the tile part header and 27 denotes the tile encoded data. The, tile part header 26 contains various types of information needed to decode the data 27.

As described above, in the present embodiment, it is assumed that the input code stream c is previously compression coded using a progression order and tile part suited to the desired access control method and conditions. However, the present invention is not limited to such an arrangement. That is, in a case where the code stream c is not previously compression coded using a progression order and tile part suited to the desired access control method and conditions, after inputting such code stream, the code stream c may be re-compression coded using a progression order and tile part suited to the desired access control method and conditions.

The foregoing describes the structure of the code stream, tile and tile part of the present embodiment.

The encryption processing unit 141 used in the present embodiment as described above contains an encryption tile part designator 11. The encryption tile part designator 11 reads data belonging to the main header and the tile part header within the input code stream c, analyzes the tile and tile part structure, determines which tile parts are to be encrypted and outputs the determination result as encrypted tile part data "ta". The tile parts to be encrypted may be designated explicitly by the user, or information previously stored in a RAM or HD may be used instead.

A detailed description is now given of the access control method of the present embodiment. In the present embodiment, two types of access control methods can be set for the tile parts: sequential access control or random access control.

A description is first given of the sequential access control method. The sequential access control method of the present embodiment is an access control method in which, if the first data unit can be accessed, the second data unit can also be automatically accessed, but the third data unit cannot be accessed.

If explained by way of the example depicted in FIG. 4A, for example, the first data unit would be tile parts 4-7 corresponding to the intermediate resolution level 43, the second data unit would be tile parts 0-3 corresponding to the lowest resolution level 42 and the third data unit would be tile parts 8-11 corresponding to the highest resolution level 44. In the sequential access control method, if the intermediate resolution level can be accessed, then the lower resolution level can also be automatically accessed as well, but any higher resolution level cannot be accessed.

In the example depicted in FIG. 4B, for example, the first data unit would be tile parts 1, 4, 7 and 10 corresponding to the intermediate resolution level in each precinct, the second data unit would be the tile parts 0, 3, 6 and 9 corresponding to the lower resolution level and the third data unit would be tile parts 2, 5, 8 and 11 corresponding to the higher resolution level. That is, as similar to FIG. 4A, in the sequential access control method, even within each individual precinct, if the intermediate resolution level can be accessed, then the lower resolution level can also be automatically accessed as well, but any higher resolution level cannot be accessed. In other words, if the first data unit can be decrypted, then the second data unit can also decrypted, but the third data unit cannot be accessed. That is, in the sequential access control method, a plurality of data units have priority for being accessed.

Next a description is given of the random access control method. The random access control method of the present embodiment is an access control method in which the second data unit cannot be accessed even if the first data unit can be accessed.

In the example depicted in FIG. 4A, for example, the first data unit and the second data unit would be the individual tile parts corresponding to the precincts of the resolution levels 42, 43 and 44. In the random access control method, even if one precinct has been accessed, the other precincts cannot be accessed (that is, the other precinct can not be decrypted) if there is no decryption key.

In the example depicted in FIG. 4B, for example, the "data units" are tile parts 0-2, 3-5, 6-8 and 9-11, corresponding to the upper left precinct (0,0), the upper right precinct (0,1), the lower left precinct (1,0) and the lower right precinct(1,1), respectively. In the random access control method, even if one precinct has been accessed, the other precincts cannot be accessed (decrypted) if there are no key information.

The foregoing represents a description of the sequential access control method and the random access control method. In the present embodiment, the sequential access control method is used for the resolution level while the random access control method is used for the precincts.

For example, in FIG. 4A, within tile parts 4-7 within resolution level 43, it is possible to set which is encrypted freely (need not necessarily be limited to only one such tile part). If one of the tile parts within group 43 is encrypted, all of the tile parts included in group 44, which stores data of a higher resolution, are determined to be encrypted unconditionally.

In the example shown in FIG. 4B, data of different resolution levels is included within group 46 (other groups are the same), so that, for example, if tile part 1 is encrypted, tile part 2, which has a higher resolution, is also encrypted. The reason why arranging this is similar to the description using FIG. 4B. However, encrypting tile part 1 has no effect on other groups, because tile group 47 is considered as a separate and independent precinct from tile group 46.

A further description of the above-described access control method of the present embodiment is now given with reference to a tree structure.

Figure 5A:
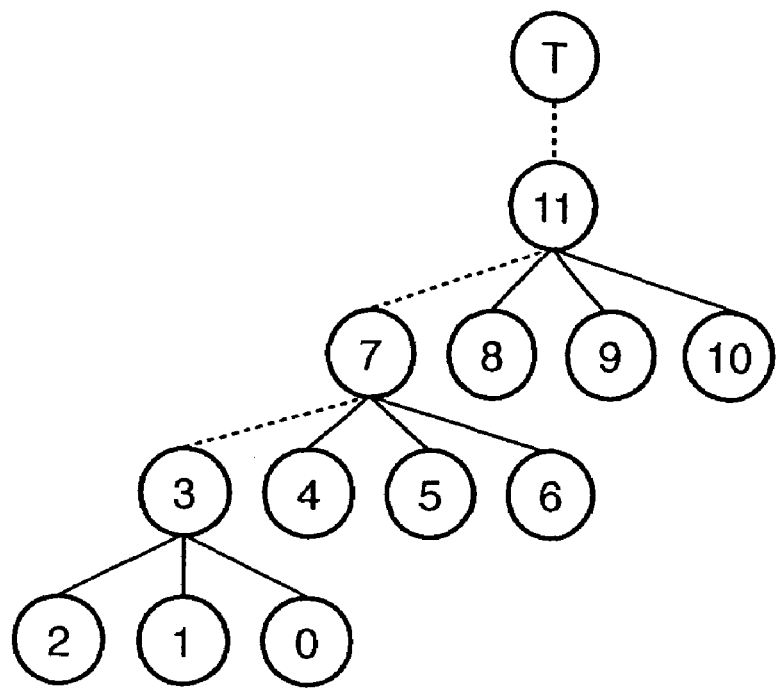
FIGS. 5A and 5B are diagrams illustrating the tree structure of a key according to one embodiment of the present invention.
Figure 5B:
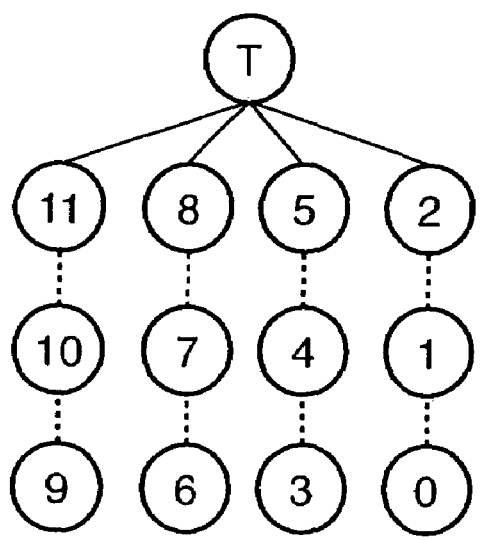

FIGS. 5A and 5B are diagrams illustrating the tree structure of a key according to one embodiment of the present invention. FIG. 5A corresponds to FIG. 4A and FIG. 5B corresponds to FIG. 4B.

It should be noted that, in FIGS. 5A and 5B, each node corresponds to an individual tile part. In addition, solid lines denote random access control and dashed lines denote sequential access control.

Using FIGS. 5A and 5B, a description of the access control method of the present embodiment contains the following three points:

(1) If a parent node can be accessed, the child node can automatically be accessed as well (random access control).

(2) Even if a child node can be accessed, the parent node cannot be accessed.

(3) Sibling nodes cannot be accessed (sequential access control).

FIG. 5A shows an example of access key generation in order to grant access to intermediate resolution level 43 as well as to low resolution level 42, for a code stream like that shown in FIG. 4B.

A description is now given for the reason for using a tree structure like that depicted in FIGS. 5A and 5B, taking FIG. 5A first.

FIG. 5A corresponds to FIG. 4A. In the present embodiment, even if an image is reproduced up to a given resolution, so long as there is no decryption key for the image area, such each image area cannot be reproduced correctly.

Note that, since the tile parts 0-11 shown in FIG. 5A are the same as escribed above, the tile parts 0-3 belong to the same resolution level, the tile parts 4-7 belong to the same resolution level, and the tile parts 8-11 belong to the same resolution level.

So, given the foregoing point, it is necessary that, in the example shown in FIG. 4A, though tile part 4 of resolution level 43 is encrypted, it does not matter whether the other tile parts 5, 6 and 7 included in the same resolution level 43 are encrypted or not. Furthermore, if image of lower level (resolution level 43) than the resolution level 44 has a encrypted tile part, it is desirable that the resolution level 44 can not be reproduced.

To explain the foregoing point in terms that are more easily understandable, if at least one tile part in a given resolution level is encrypted, then higher resolution levels are also unconditionally encrypted, and whether or not other tile parts within the same resolution level are to be encrypted can be set as desired independently.

In order to implement the foregoing arrangement, when concentrating on one resolution level, an encryption key may be provided for that entire resolution level, and moreover, an encryption key may be provided for each tile part within that resolution level. However, in encoding/decoding of JPEG2000 algorithm, there is no header data expressing a plurality of tile parts.

Accordingly, in the present embodiment, the tile part corresponding to coordinate position (1,1) in a single resolution level is taken to represent that resolution level. It should be noted that the coordinate of a tile part expressing the resolution may be set according to various conditions.

Describing the foregoing point in terms of the examples depicted in FIGS. 5A and 4A, generating an encryption key for tile part 11 within resolution level 44 (which is the highest resolution level) involves using a hash function from a tile key T (that is, the key data generated form the encoded data for the entire input tile). An encryption key of tile part representing a resolution lower than the highest resolution is generated based upon a generated encryption key for the tile part representing higher resolution. For example, for resolution level 43, which has a lower resolution than that of resolution level 44, the encryption key for tile part 7 is generated based on the encryption key for tile part 11 within the higher resolution level. Similarly, the encryption key for tile part 3 in resolution level 42 is generated based on the encryption key for tile part 7. The dashed lines in FIG. 5A shows above relationship.

With respect to the encryption keys for tile parts 8, 9 and 10 in resolution level 44 are generated using the encryption key for tile part 11 and the respective tile part indexes "8-10". For example, the encryption key for tile part 8 is generated based on the tile part 8 index "8" and the encryption key for tile part 11. As a result, the hierarchical relation among the encryption keys for tile parts 8, 9 and 10 is eliminated. This means that tile parts 9 and 10 can not be decrypted using the decryption key only for decrypting the tile part 8. Furthermore, if the encryption key only for encrypting tile part 11 is known, it is possible to cause only tile part 8, for example to be encrypted. Accordingly, if the encryption key of the tile part 11 is known, it is possible to encrypt tile part 8.

Also, concentrating on tile parts 4, 5 and 6 of resolution level 43, encryption keys are generated using key data for tile part 7, which represents the resolution level 43, and the respective tile part indexes "4-6" as similar to tile parts 8-10.

Therefore, provided only that the decryption key, for example, for tile part 7 is obtained, keys for accessing node 0-6 shown in FIG. 5A can be generated.

FIG. 5B corresponds to FIG. 4B. The dashed lines show steps in a process of generating a key for implementing sequential access and the solid lines show steps in a process of generating a key for implementing random access.

The encryption tile part designator 11 outputs access methods for the tile parts as described above as encryption tile part data "ta". An example of encrypted tile part data "ta" in the examples depicted in FIGS. 4A and 4B described above is explained using FIGS. 6A and 6B.

FIGS. 6A and 6B are diagrams illustrating encrypted tile part data according to one embodiment of the present invention. More specifically, FIGS. 6A and 6B are diagrams depicting what type of access method is generated for each tile part, with FIG. 6A corresponding to FIG. 4A and FIG. 6B corresponding to FIG. 4B.

As for the access control method, "0" denotes the sequential access control method and "1" denotes the random access control method. As shown in FIGS. 6A and 6B, the encrypted tile part data "ta" shows a separate access control method for each and every tile part.

As described above, encryption tile part data "ta" is output from the encryption tile part designator 11 and input to a key matrix generator 12 and an encryption unit 13.

Next, a description is given of the operation of the key matrix generator 12. The code stream c and the encrypted tile part data ta are input. into the key matrix generator 12 and a key matrix ka is generated from the input code stream c and encrypted tile part data ta. The key matrix generator 12 then outputs the key matrix ka so generated as well as a code stream key ck.

Figure 7A:
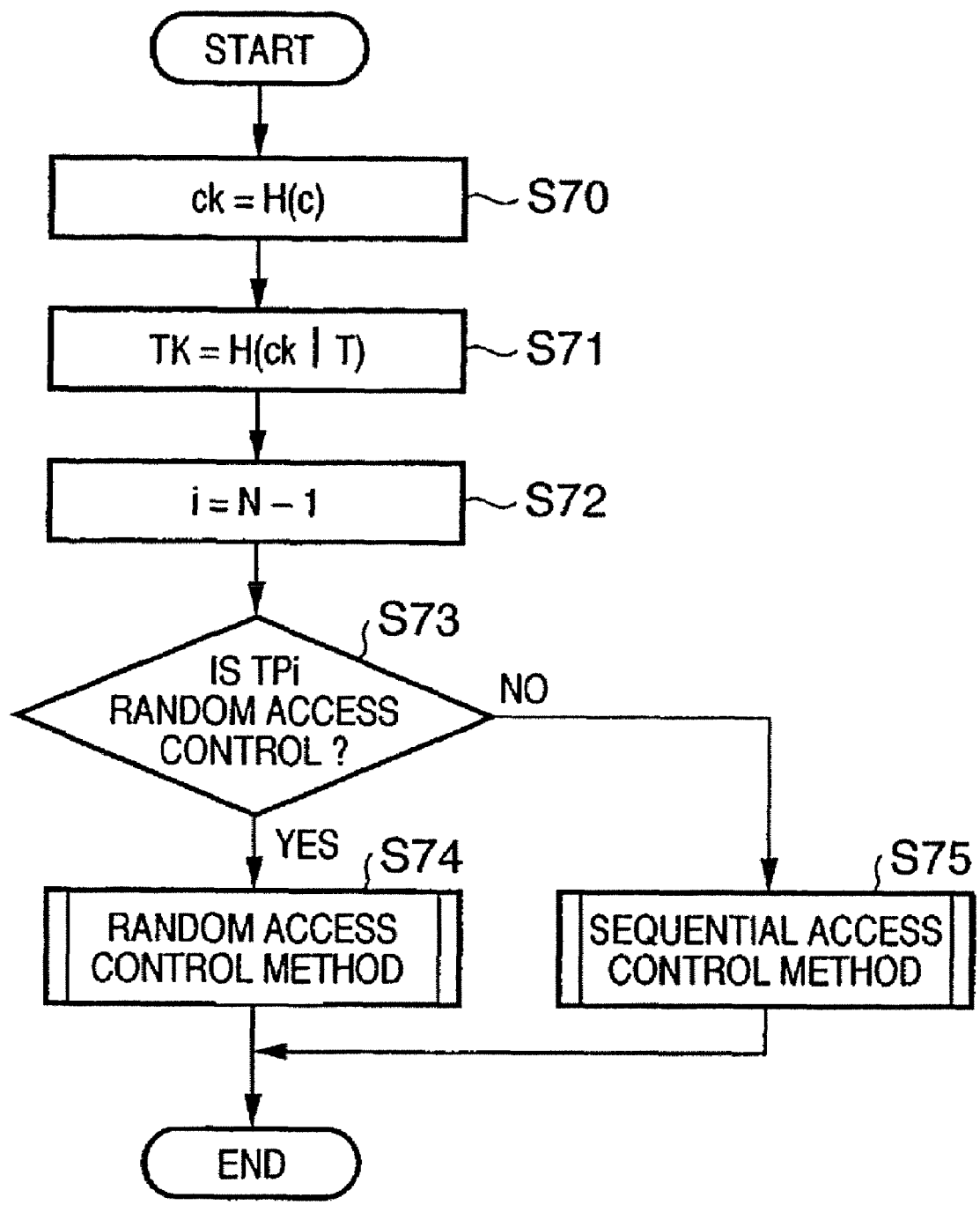

Here, a description is given of the process of generating a key matrix as executed by the key matrix generator 12, using FIG. 7A.

FIGS. 7A shows a flow chart in a process of generating a key matrix in the key matrix generator 12 according to one embodiment of the present invention.

First, in a step S70 shown in FIG. 7A, a code stream key ck is generated. The code stream key ck is calculated as a code stream hash value using the following equation (1):

$$ck = H(c) \tag{1}$$

Where H() is a unidirectional function, having unidirectional (that is, irreversible) and impact-proof properties. Thus, for example, encryption processes and the like involving hash function and DES can be applied. In addition, when using a typical hash function as the unidirectional function, the code stream key "ck" differs with every code stream. On the other hand, when using a keyed hash function as the unidirectional function, the key differs with every user and code stream.

The code stream key "ck" is a value corresponding to the route node in the tree structure depicted in FIGS. 5A and 5B, and is generated on the basis of one input image.

Next, in a step S71, a tile key TK is generated. A tile key TK is calculated as a code stream key ck and a tile index hash value using the following equation (2):

$$TK = H(ck|T) \tag{2}$$

where "T" is the tile index.

It should be noted that, to simplify the description according to the present embodiment, the code stream c is composed of a single tile. That is, ti is fixed at "0". Accordingly, there is only one tile key generated for the whole code stream.

However, the present invention is not limited to such a configuration and can be adapted to a configuration in which the code stream is composed of multiple tiles. In such a situation, a tile key may be generated for each individual tile using equation (2), and further, the process may be executed for each tile.

Next, in a step S72, parameter i is initialized to an initial value of "N−1". Parameter i denotes the tile part index under consideration and N is the total number of tile parts included in the tile. That is, in the present embodiment, the tile part keys are generated in sequence starting from the tile part key having the maximum tile part index among all tiles.

Next, in a step S73, using an input encrypted tile part data ta, it is determined whether or not tile part TPi is subject to random access control or sequential access control. If random access control is used, then the process proceeds to a step S74. If sequential access control is used, then the process proceeds to a step S75.

Detailed descriptions of the random access control method in step S74 and the sequential access control method in step S75 are given below. The routine ends after the processes of steps S74 and S75 are completed.

A detailed description is now given of the random access control process S74 and the sequential access control process S75.

Figure 7B:
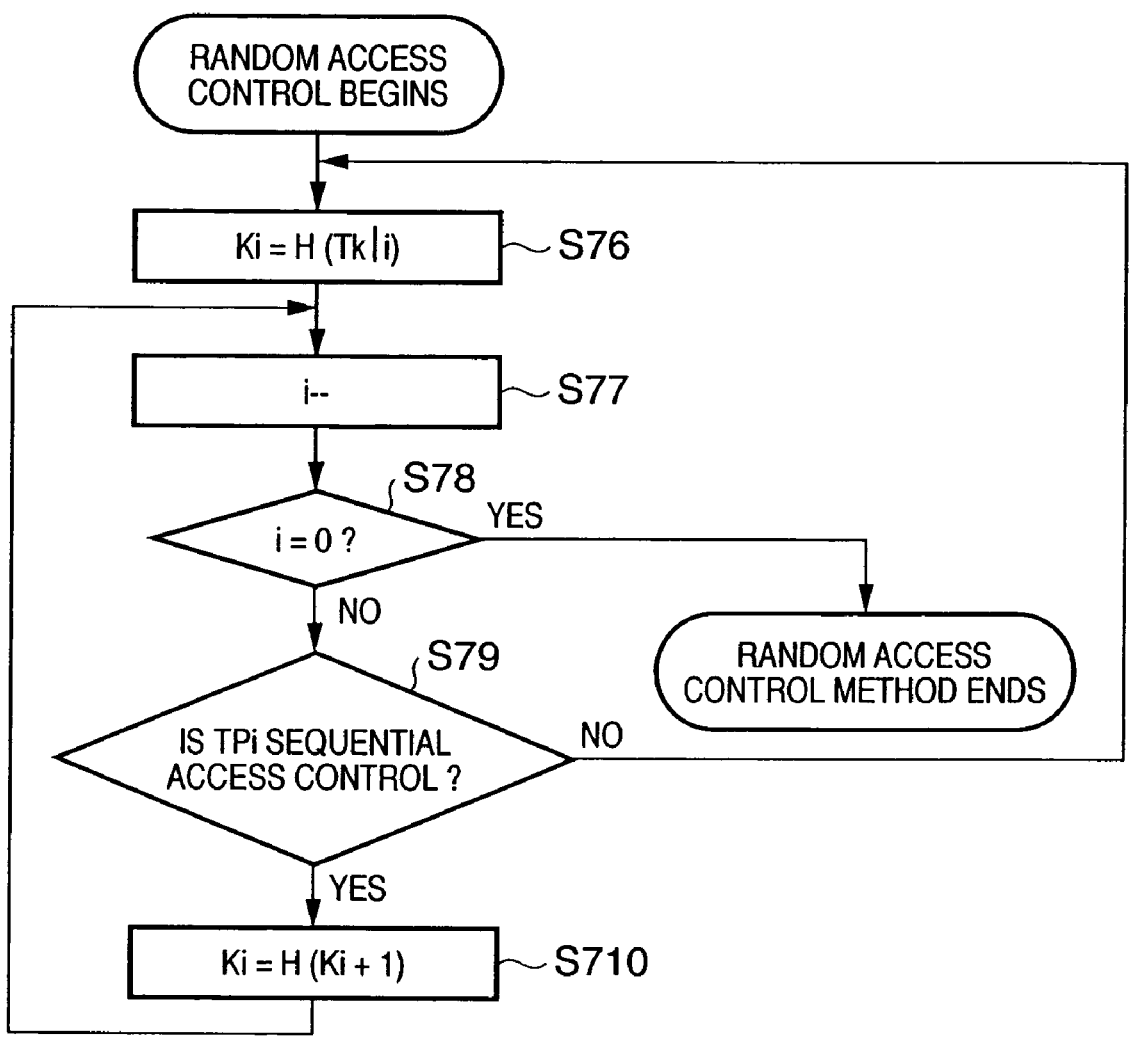

First, a description is given of the random access control method using FIG. 7B. First, in a step S76, the tile part TPi tile part key Ki is calculated using the following equation (3):

$$Ki = H(TK|i) \tag{3}$$

where the tile part key Ki is generated from the tile key TK and the relevant tile part index i using a unidirectional function. The tile part key Ki so generated is recorded in a key-matrix ka.

Here, a description of an example of a key matrix ka is given using FIG. 15. FIG. 15 shows an example of a key matrix ka that can be adapted to the present embodiment. As shown in FIG. 15, individual tile part keys corresponding to individual tile parts are recorded in the key matrix ka.

Next, in a step S77, the parameter i is decremented by just 1, and thereafter, in a step S78, it is determined whether or not the parameter i is "0". If the parameter i is 0 (that is, if all the tile parts in the tile have been processed), then the process terminates. On the other hand, if the parameter i is not 0 (that is, if there exist tile parts in the tile that have not been processed), then the process proceeds to a step S79.

In step S79, using the input encrypted tile part data ta, it is determined whether the tile part TPi is to be subjected to sequential access control or random access control. If sequential access control is to be used, then the process proceeds to a step S710. If random access control is to be used, then the process proceeds to step S76.

In step S710, the tile part TPi tile part key Ki is calculated using the following equation (4)

$$Ki = H(K\_i+1) \tag{4}$$

That is, the tile part key Ki is generated from the preceding tile part key K_i+1 using a unidirectional function. The process then proceeds to step S77 after the tile part key Ki has been generated in step S710.

Next, a description is given of the sequential access control method using FIG. 7C. In a step S711, the tile part key Ki of the tile part TPi is calculated using the following equation (5):

$$Ki = H(KT) \tag{5}$$

That is, the tile part key Ki is generated using a unidirectional function. The tile part key Ki is then recorded in the key matrix ka.

Next, in a step S713, the parameter i is decremented by just 1, and thereafter, it is determined in step S713 whether or not the parameter i is "0". If the parameter i is 0 (that is, if all the tile parts in the tile have been processed), then the process terminates. On the other hand, if the parameter i is not 0 (that is, if there exist tile parts in the tile that have not been processed), then the process proceeds to a step S714.

In step S714, using the input encrypted tile part data "ta", it is determined whether the tile part TPi is subject to sequential access control or random access control. If random access control is used then the process proceeds to a step S715. If sequential access control is used then the process proceeds to a step S716.

In a step S715, then the tile part TPi tile part key Ki is calculated using the following equation (6):

$$Ki = H(Kj|i) \quad (6)$$

That is, the tile part key Ki under consideration is generated from the tile part key Kj and the tile part index using a hash function. After the tile part key Ki is generated in step S715 the process then proceeds to a step S713.

In step S716, the tile part key Ki of the tile part TPi is calculated using the following equation (7):

$$Ki = H(Kj) \quad (7)$$

where, j is the tile part index of the tile part immediately preceding the tile part TPi under consideration that is subject to sequential access control (that is, the tile part corresponding to the parent node of the tile part TPi). In other words, the tile part key Ki under consideration is generated from the tile part key Kj using the hash function. After the tile part key Ki is generated in step S716 the process then proceeds to a step S712.

Thus a key matrix ka is generated as described above. The key matrix ka is then input to the encryption unit 13.

Next a description is given of the processes performed by the encryption unit 13. The encryption unit 13 inputs the code stream c, the encryption tile part data ta and the key matrix ka and encrypts the tile part of the code stream c indicated by the encryption tile part data ta using the tile part key recorded in the key matrix ka and outputs an encrypted code stream c'.

A description is now given of the encryption process performed by the encryption unit 13. In the encryption unit 13, if the tile part(s) that form the input code stream c is defined as TPi, then encryption is performed using the tile part key Ki corresponding to that tile part.

In JPEG2000, the data that forms the tile parts are themselves composed of units called packets. The packets, in turn, are composed of a header portion (hereinafter simply header) and a body portion (hereinafter simply body). In the present embodiment, the header is not encrypted but the body is encrypted. Encrypting the packets in this way makes it possible to decode(decompress) even an encrypted image.

However, it should be noted that the present invention is not limited to such an arrangement, and portions of the header and the body, or even the entire packet, may be encrypted.

Additionally, the present invention is not limited to the encryption methods described above with respect to the present embodiment. Rather, a variety of encryption algorithms can be adapted to the present invention, including, for example, DES (Data Encryption Standard) and AES (Advanced Encryption Standard).

Figure 16A:
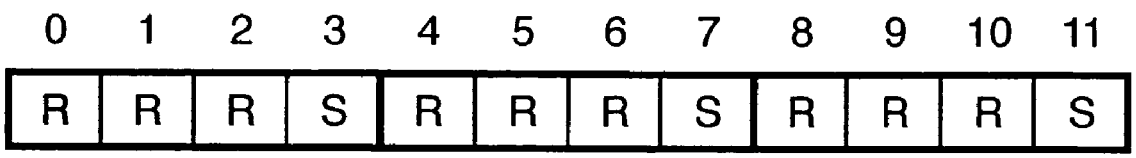
FIGS. 16A and 16B are diagrams illustrating a marker according to one embodiment of the present invention.
Figure 16B:
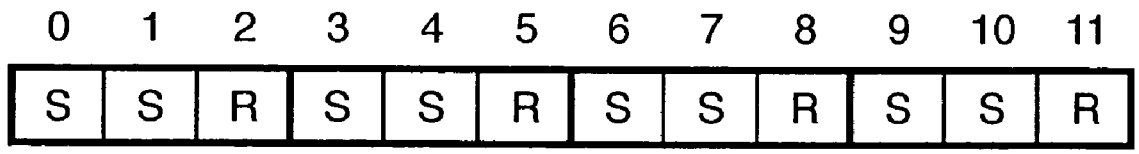

Additionally, when encrypting a tile part, a maker indicating that encryption has been done and the type of encryption is recorded into the tile part header of the tile part. Thus, for example, FIGS. 16A and 16B are diagrams illustrating a marker according to one embodiment of the present invention, in which "S" is the marker used to denote sequential access control and "R" is the marker used to denote random access control. FIGS. 16A and 16B correspond to FIGS. 4A and 4B, respectively.

As shown in FIGS. 16A and 16B, a marker is attached to the tile part header of each individual tile part. By thus marking the type of access control method used, and by encrypting the tile part, it is possible to transmit to a decryption processing unit to be described below instructions as to how to generate a key for decoding said tile part.

As described above, the encrypted code stream is output as encrypted code stream c'. The foregoing constitutes the description of the encryption processing unit 141 of FIG. 14.

It should be noted that, in the present embodiment, reference is made to an example in which all the tile parts included in the tile are encrypted. However, the present invention is not limited to such a configuration, and so only a certain arbitrary number of the tile parts composing the tile may be encrypted. For example, in the example depicted in FIG. 4A described above, the tile part belonging to the lowest resolution level (42 in FIG. 4A) is not encrypted whereas the remaining tile parts (43 and 44 in FIG. 4A) are encrypted. Such an arrangement allows an unauthorized user (that is, a user to whom access is not granted) to reproduce only a lowest-resolution image, whereas an authorized user (that is, a user to whom access is granted) is able to reproduce a high resolution level image. In an example like that depicted in FIG. 4B, a tile part (46 in FIG. 4B) belonging to a predetermined precinct (that is, a spatial area of an image) is not encrypted, whereas the remaining tile parts (47, 48 and 49 in FIG. 4B) are encrypted. Such an arrangement prevents an unauthorized user from reproducing the aforementioned predetermined precinct (the spatial area of the image) whereas an authorized user can reproduce the entire image.

That the encryption processing unit 141 of the present embodiment described above can be implemented by an ordinary information processing apparatus such as a personal computer or the like can be easily inferred. Moreover, because the above-described functions may be implemented by an information processing apparatus such as a personal computer, the distinctive features of the present embodiment extend to the information processing methods, and further, to the computer program and to the computer-readable storage medium on which the aforementioned computer program is stored.

(Access Key Generator)

Figure 9:
FIG. 9 is a block diagram of an access key generator according to one embodiment of the present invention.

Next, a description is given of the access key generator (or function) adapted to the present embodiment, using FIG. 9.

FIG. 9 is a block diagram of an access key generator according to one embodiment of the present invention.

As shown in FIG. 9, a code stream key "ck" and an index "an" that permits access are input to the access key generator. From the input code stream key ck, the access key generator then generates an access key ak (a decryption key that decrypts an encryption) that corresponds to the accessible index "an", and the access key "ak" so generated is then output. Here, the accessible index "an" is an accessible tile part index.

As shown in FIGS. 5A and 5B, in the present embodiment, the tile parts may be expressed as tree structures. Of the nodes that form the tree structures shown in FIGS. 5A and 5B, one node is designated by the accessible index "an" and an access key corresponding to that designated node is generated.

As for the method of generating the access key for the designated node, the input code stream key ck may be matched to a route node and a key generated that corresponds to each node in sequence according to a method like that depicted in FIGS. 7A, 7B and 7C, and this process may be repeated until becoming the index "an" for the accessible node.

The generated access key is output according to a format like that depicted in FIG. 8.

FIG. 8 is a diagram showing the format of an access key according to one embodiment of the present invention. As shown in FIG. 8, ak is composed of the access key and the tile part indexes corresponding to such access key. Where a plurality of nodes is designated, the access keys corresponding to each and every node, as well as the tile part indexes corresponding to these access nodes, are all recorded.

A description is now given of the process of generating an access key using the access key generator, using an example.

FIGS. 10A and 10B are diagrams illustrating access control according to one embodiment of the present invention. More specifically, FIGS. 10A and 10B show an example of access key generation corresponding to a code stream implemented by a type of access control like that shown in FIGS. 4A, 4B and 4C. FIGS. 10A and 10B correspond to FIGS. 4A (FIG. 5A) and 4B (FIG. 5B), respectively.

FIG. 10A shows an example of the process of generating an access key for a code stream like that depicted in FIG. 4B, for granting access to the intermediate resolution level 43 and to the low resolution level 42.

In the case of this example, the tile part key corresponding to the tile part index "7" is generated from the tile key in sequence using the hash function, and is generated as an access key. The nodes indicated in FIG. 10A by shading can then be accessed by the access key so generated.

By contrast, FIG. 10B shows an example of the process of generating an access key for the purpose of providing access to the right half of a whole image, with respect to a code stream like that depicted in FIG. 4B. In the case of this example, the tile part keys corresponding to tile part index "8" and to tile part index "2", which represent the right half of the image, are generated as access keys in sequence from the individual tile keys using the hash function. The nodes indicated by shading in FIG. 10B can then be accessed by the access keys so generated.

It should be noted that, as can be appreciated by those of skill in the art from the foregoing description, the relationship between FIGS. 10A and 10B are similar to that of FIGS. 5A and 5B shown above.

After being stored in a format like that shown in FIG. 8 by the method described above, the key matrix ka is then sent to a decryption processing unit to be described later (in actuality, provided in response to a request from the decryption processing unit). whole or a part of the output access key ka may be encrypted in order to ensure its secure transmission to the decryption processing unit.

(Decryption Processing Unit)

A description is first given of the general operations of the decryption processing unit 143 and the access key generator 142 of the present embodiment, after which a description is given of the detailed operation of the decryption processing unit 143. The present invention is easier to understand if the decryption processing unit 143 is thought of as an ordinary personal computer (PC) which the user owns and which can be connected to the Internet and the access key generator 142 is thought of as a verification server for releasing the encryption, and so the present description is based on these assumptions.

Having received an encrypted code stream c', the decryption processing unit (that is, the client PC) 143 recreates (reproduces) an image based on unencrypted tile part encryption data. Therefore, the resolution of an image that can be recreated is self-limiting. If the user of the decryption processing unit wants to be able to recreate an image with a higher resolution, nodes of the desired level are determined according to instructions from the user starting from the encrypted tile part and moving upstream therefrom. This determined node level (that is, tile part index) is requested to the access key generator 142 (that is, the verification server) as an index "an". As a result, an access key Ka corresponding to the requested node is sent from the access key generator 142 to the decryption processing unit (client PC) 143. Based on the access key Ka so received, the decryption processing unit (client PC) 143 generates a key group for decrypting the downward encryption, and then decrypts the encrypted-encoded data using generated keys and decoding the decrypted encoded data.

It should be noted that, when the access key generator 142 receives a request indicating a desire to obtain the access key Ka from the client (corresponding to the decryption processing unit), it probably provides the access key after first verifying user identity and processing billing. Therefore, when making the access key generator 142 a server on the Internet, it is necessary to visualize a plurality of encryption processing units and a plurality of decryption processing units, and along with information identifying multiple images code stream keys corresponding to each individual image must be recordable. The decryption processing unit 143, by providing the information identifying images and the tile part index for decrypting the code, obtains the access key Ka for the node level targeting the desired image. For any single image, all the access key generator 142 (verification server) has to do is to store the information identifying that image (that is, the ID, the file name, and so forth) and the one code stream for the route nodes for that image, thereby reducing the amount of information that must be managed.

Figure 11:
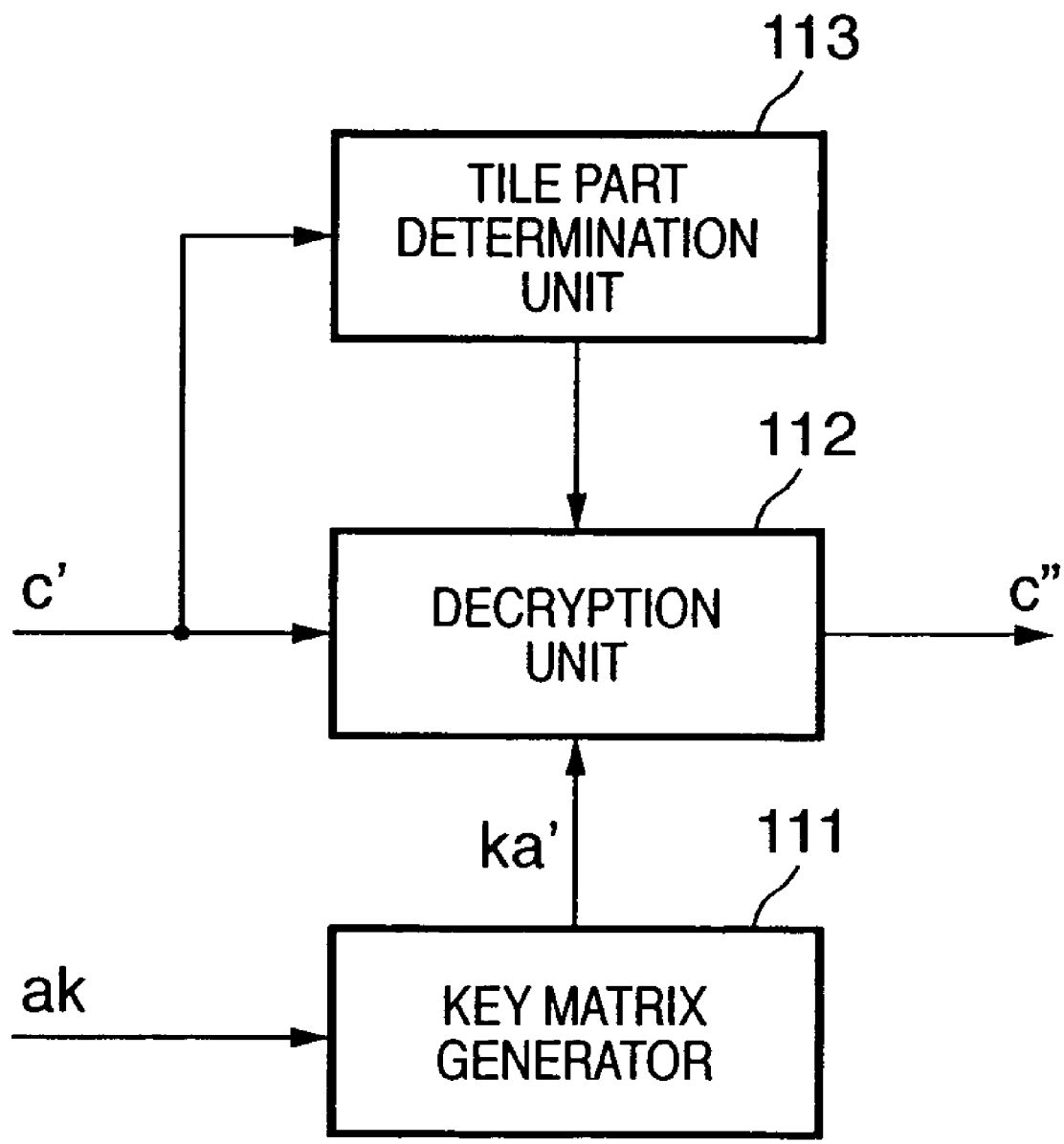
FIG. 11 is a block diagram of a decryption processing unit according to one embodiment of the present invention.

Given the foregoing, a description is now given of the decryption processing unit (decryption function) adapted to the present embodiment, using FIG. 11.

FIG. 11 is a block diagram of a decryption processing unit 143 according to one embodiment of the present invention. As shown in FIG. 11, the decryption processing unit 143 comprises a key matrix generator 111, an decryption unit 112 and an encryption tile part determination unit 113.

First, as an initial matter, a detailed description is given of the processes performed by the key matrix generator 111.

An access key Ka for the tile part index requested from the access key generator 142 is input to the key matrix generator 111. From the input access key Ka, the key matrix generator 111 then generates a key matrix ka' (a decryption key corresponding to each node(tile part)) and outputs the key matrix ka' so generated.

Figure 12A:
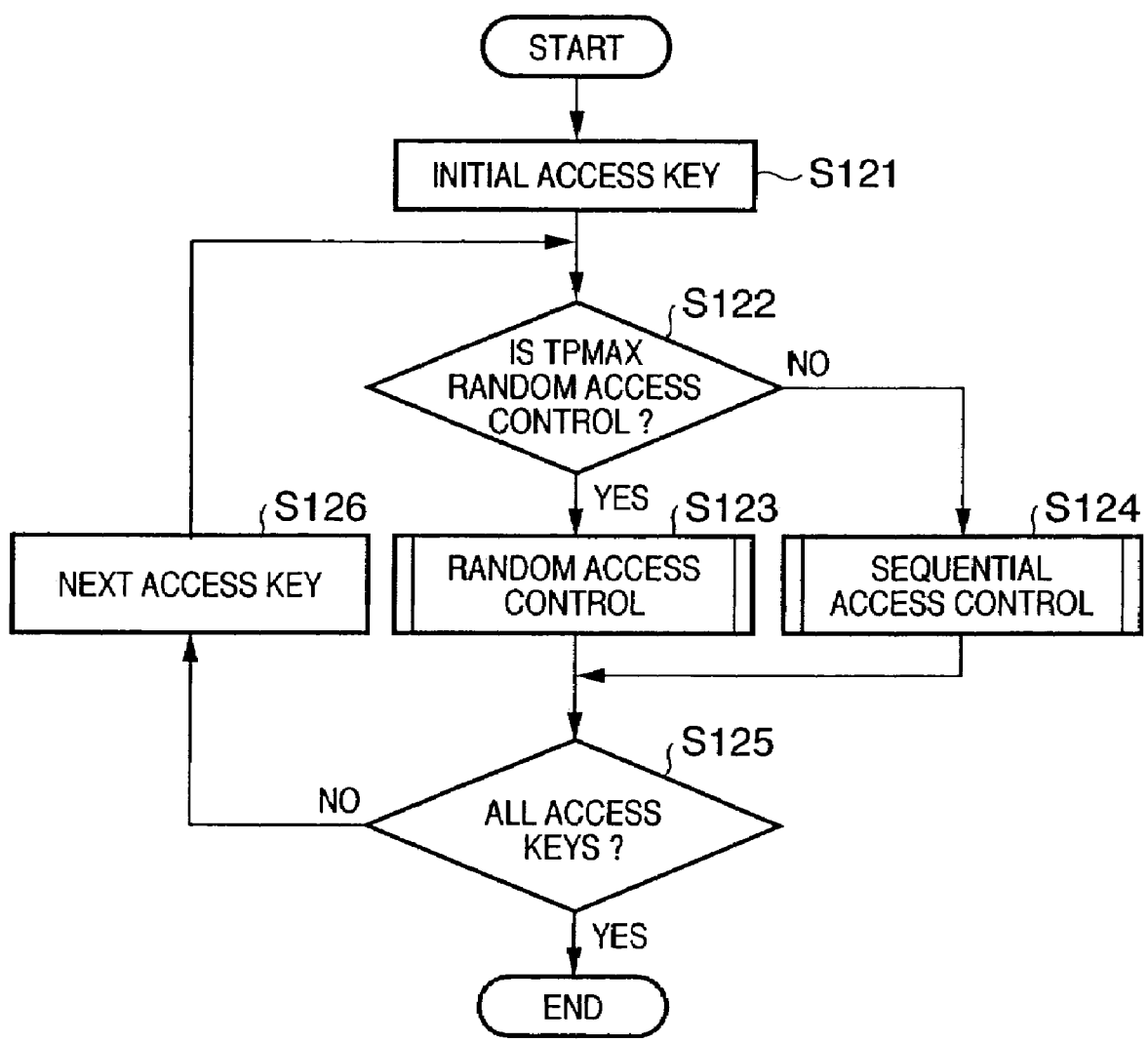
FIGS. 12A, 12B and 12C are flow charts showing steps in a process of generating a key matrix in the decryption processing unit according to one embodiment of the present invention.

A detailed description is now given of the process of generating a key matrix executed by the key matrix generator 111, using FIG. 12A.

FIG. 12A is a flow charts showing steps in a process of generating key matrixes in the decryption processing unit according to one embodiment of the present invention. The markers used in the following description, please refer to FIGS. 16A and 16B described above.

First, the initial access key included in the access key ak input in a step S121 is considered.

In a step S122, it is determined whether, of the tile parts included in the tile, the tile part with the biggest tile part index is subjected to random access control or sequential access control. The determination can be made by analyzing the tile part header to determine if the marker "R" is attached or the marker "S" is attached. If the tile part with the biggest tile part index is subjected to random access control, the process then proceeds to a step S123. If the tile part with the biggest tile part index is subjected to sequential access control, the process then proceeds to a step S124.

A detailed description of the random access control in step S123 and the sequential access control of step S124 is given later.

After steps S123 and S124 have been performed, the process then proceeds to a step S125. In step S125, it is determined whether or not all the access key values included in the access key that has been input have been processed. The process terminates if all the access key values have been processed. If all the access key values have not been processed the process then proceeds to a step S126. In step S126, the next access key is considered and the process then proceeds to step S122.

Figure 12B:
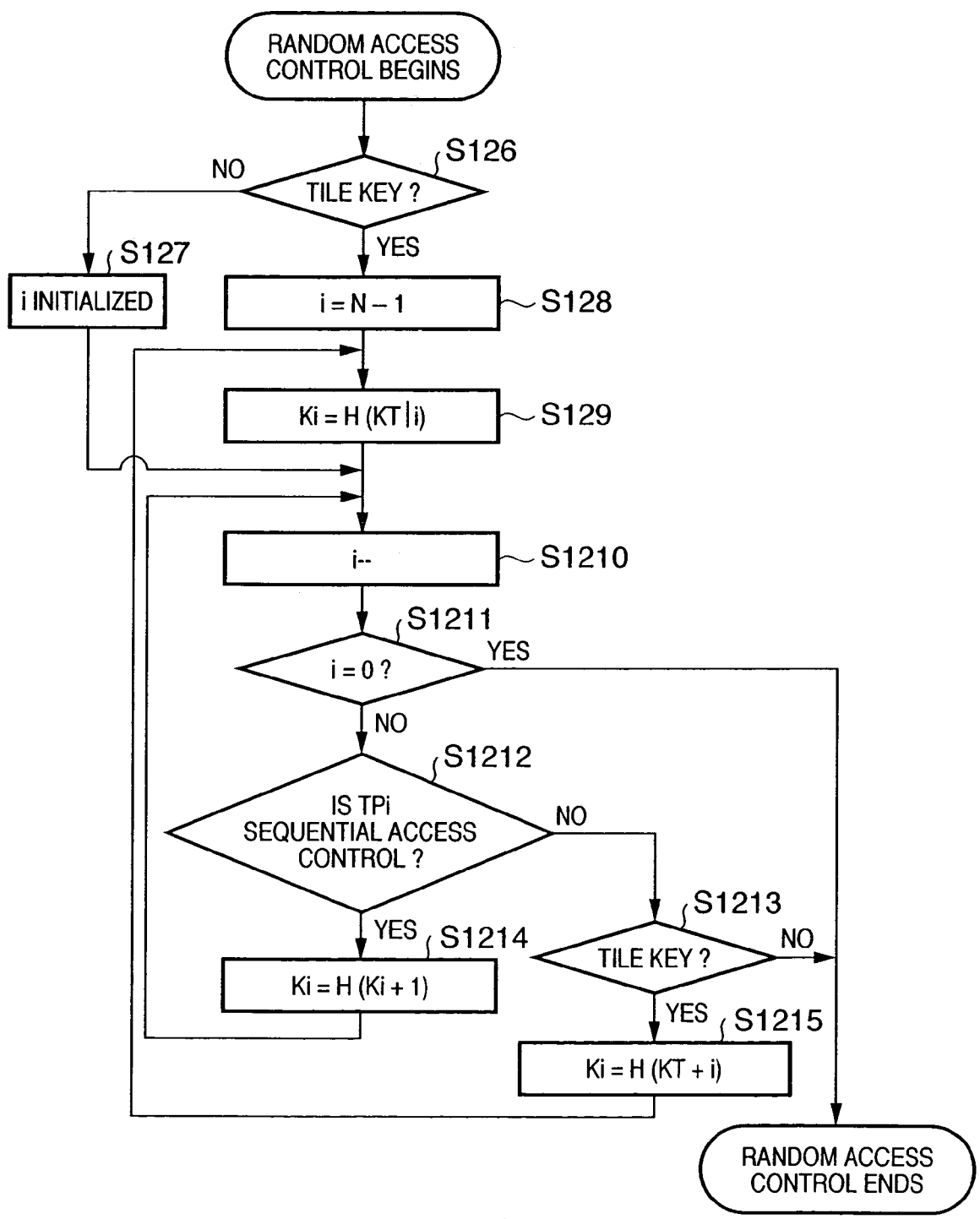

A description is now given of random access control, using FIG. 12B. First, in step S126, it is determined whether or not the access key values are tile keys. If so, the process then proceeds to a step S128. If not, the process then proceeds to a step S127.

In step S128, the parameter i is initialized to an initial value "N−1". Parameter i is a parameter that indicates the tile part index under consideration and N is the total number of tile parts included in that tile. Thereafter the process proceeds to a step S129.

In step S129, the tile part key of the tile part TPi is calculated using the following equation (8):

$$Ki=H(KT|i) \quad (8)$$

In other words, the tile part key Ki is generated from the tile key TK and the relevant tile part index i using a unidirectional function. The tile part key Ki so generated is recorded in a key matrix ka'. After the tile part key Ki is generated, the process then proceeds to a step S1210.

In step S127, the parameter i is initialized to the tile part index corresponding to the access key currently. Thereafter, the process proceeds to step S1210.

In a step S1210, the parameter i is decremented by just 1, and thereafter, in a step S1211, it is determined whether or not the parameter i is "0". If the parameter i is 0 (that is, if all the tile parts in the tile have been processed), then the process terminates. On the other hand, if the parameter i is not 0 (that is, if there exist tile parts in the tile that have not been processed), then the process proceeds to a step S1212.

Next, in step S1212, it is determined whether the tile part TPi is subject to sequential access control or random access control. If sequential access control is used, then the process proceeds to a step S1214. If random access control is used, then the process proceeds to a step S1213.

In step S1214, the tile part TPi tile part key Ki is calculated using the following equation (9):

$$Ki=H(K\_i+1) \quad (9)$$

That is, the tile part key Ki under consideration is generated from the preceding tile part key K_i+1 using a unidirectional function. The generated tile part key Ki is recorded in the key matrix ka'. The process then proceeds to step S1210 after the tile part key Ki has been generated in step S1214.

In step S1213, it is determined whether or not the input access key values are tile keys. If input access key values are tile keys, then the process proceeds to a step S1215. If input access key values are not tile keys, then the process terminates.

In step S1215, the tile part TPi tile part key Ki is calculated using the following equation (10):

$$Ki=H(KT|i) \quad (10)$$

That is, the tile part key Ki is generated from the tile key TK and the relevant tile part index i using a unidirectional function. The tile part key Ki so generated is recorded in the key matrix ka'. The process then proceeds to step S129 after the tile part key Ki has been generated in step S1215.

Figure 12C:
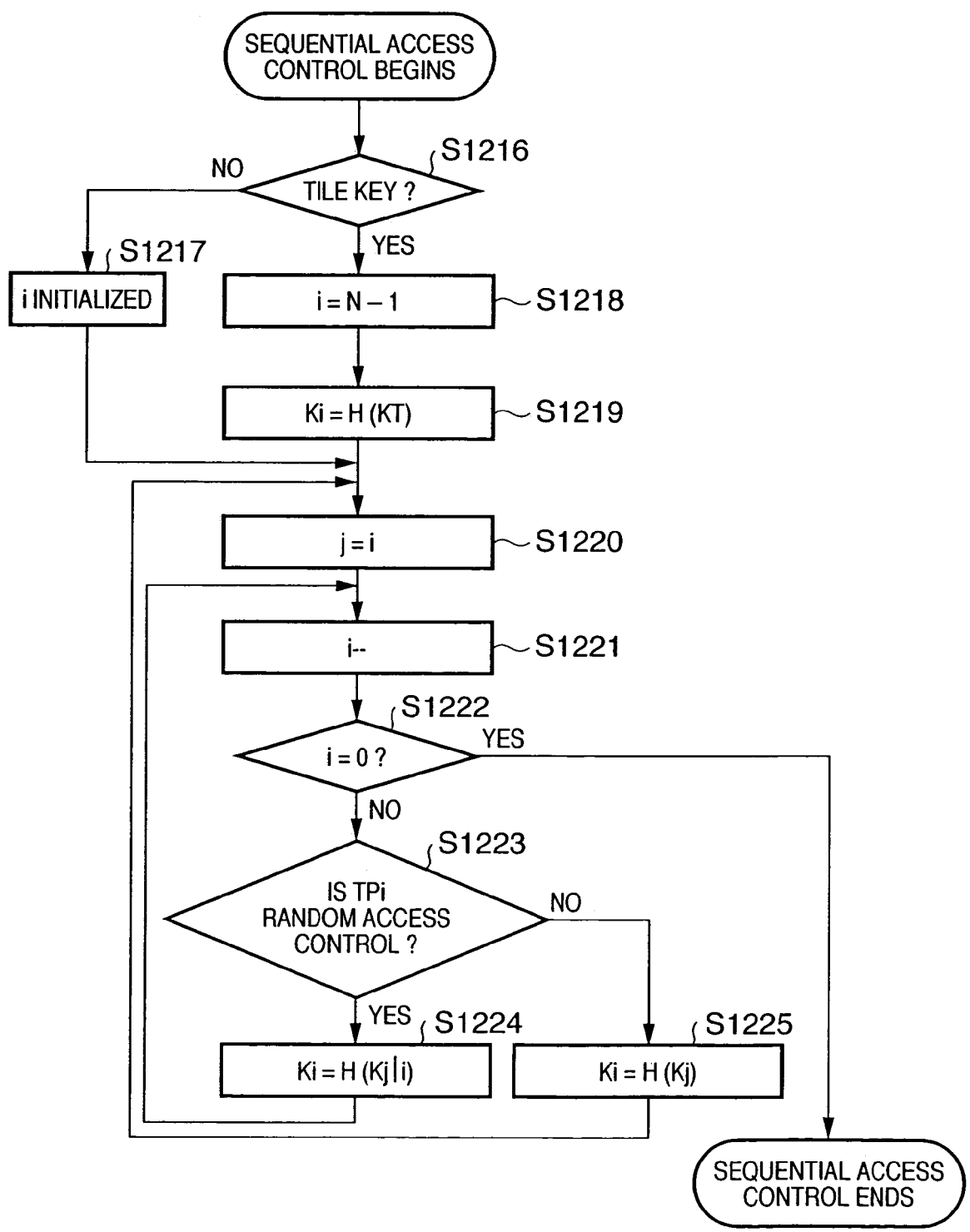

Next, a description is given of the sequential access control method using FIG. 12C.

In a step S1216, it is determined whether or not the access key values are tile keys. If the access key values are tile keys, then the process proceeds to a step S1218. If the access key values are not tile keys, then the process proceeds to a step S1217.

In step S1218, the parameter i is initialized to an initial value "N−1". Parameter i denotes the tile part index under consideration and N is the total number of tile parts included in the tile. Thereafter, the process proceeds to a step S1219.

In step S1219, the tile part TPi tile part key is calculated using the following equation (11):

$$Ki=H(KT) \quad (11)$$

That is, the tile part key Ki is generated from the tile key TK using a unidirectional function. The tile part key Ki so generated is recorded in the key matrix ka'. After the tile part key Ki has been generated the process then proceeds to a step S1220.

In step S1217, the parameter i is initialized to the tile part index corresponding to the access key currently. Thereafter, the process proceeds to step S1220.

In step S1220, the parameter i is substituted for j, where j is an index denoting the parent node of i. Next, in a step S1221, the parameter i is decremented by just 1 and thereafter, in a step S1222, it is determined whether or not the parameter i is "0". If the parameter i is 0 (that is, if all the tile parts in the tile have been processed), then the process terminates. On the other hand, if the parameter i is not 0 (that is, if there exist tile parts in the tile that have not been processed), then the process proceeds to a step S1223.

In step S1223, the tile part TPi tile part key Ki is calculated using the following equation (12):

$$Ki=H(Kj|i) \quad (12)$$

That is, the tile part key Ki under consideration is generated from the parent tile part key Kj and the tile part index i using the hash function. The tile part key Ki so generated is then recorded in the key matrix ka'. After the tile part key Ki is generated in step S1224 the process then proceeds to step S1221.

In step S1225, the tile part key Ki of the tile part TPi is calculated using the following equation (13):

$$Ki=H(Kj) \quad (13)$$

That is, the tile part key Ki under consideration is generated from the parent tile part key Kj using the unidirectional function. The tile part key Ki so generated is recorded in the key matrix ka'. After the tile part key Ki is generated in step S1225 the process then proceeds to step S1220.

Thus, the key matrix ka' is generated as described above through the process of generating a key matrix. The generated key matrix ka' is then input to the decryption unit 112.

Next, a detailed description is given of the processes performed by the decryption unit 112.

The encrypted code stream c' and key matrix ka' are input to the decryption unit 112, the encrypted tile parts in the code stream c' are decrypted using the tile part key recorded in the key matrix ka', then the decrypted code stream c' is output.

The decryption unit 112 analyzes the code stream c', extracts the tile parts, and a determination whether or not each of the extracted tile parts is encrypted is made based upon the "R" or "S" marker. The encrypted tile parts are then decrypted using the tile part key recorded in the key matrix ka'. The tile part in the code stream c' are then replaced by the decrypted tile part.

Further, decryption unit 112 delete the R or S markers recorded in the tile part header corresponding to decrypted the tile part.

Additionally, only the data is decrypted. The header is not decrypted.

Note that the decryption method must be one that corresponds to the method executed by the encryption unit described above.

As described above, depending on the access key, the encrypted code stream c' is decrypted and the decrypted code stream c is output as decoded code stream c".

Accordingly, if the decryption processing unit 143 in FIG. 14 receives and decrypts an encrypted code stream c' without receiving an access key ak from the access key generator 142, the decryption processing unit 143 will only succeed in decrypting the tile parts that have not been encrypted, allowing recreation of an image of a certain predetermined resolution or less. In other words, if a user of the decryption processing unit 143 wants a high quality or high resolution image, the user should get the access key ak and decrypt the image once again.

As described above, according to the present embodiment, it is possible to eliminate the need to manage a plurality of keys for image data having a plurality of areas or a layered structure and which is encrypted using different encryption keys for each area and each layer of the structure. Moreover, it is possible to record decryption keys corresponding to each of the plurality of areas and layers and to correctly decrypt the image data.

It should be noted although that the tile parts in the embodiment described above correspond to precincts (collective units indicating predetermined spatial areas within a tile) and resolution levels (collective units of the frequency component generated during wavelet transform), the present invention is not limited to such a configuration.

For example, ordinary compression encoding of an image involves quantizing and entropy encoding data obtained by such frequency transformation processing as wavelet transformation and orthogonal transformation.

Figure 13:
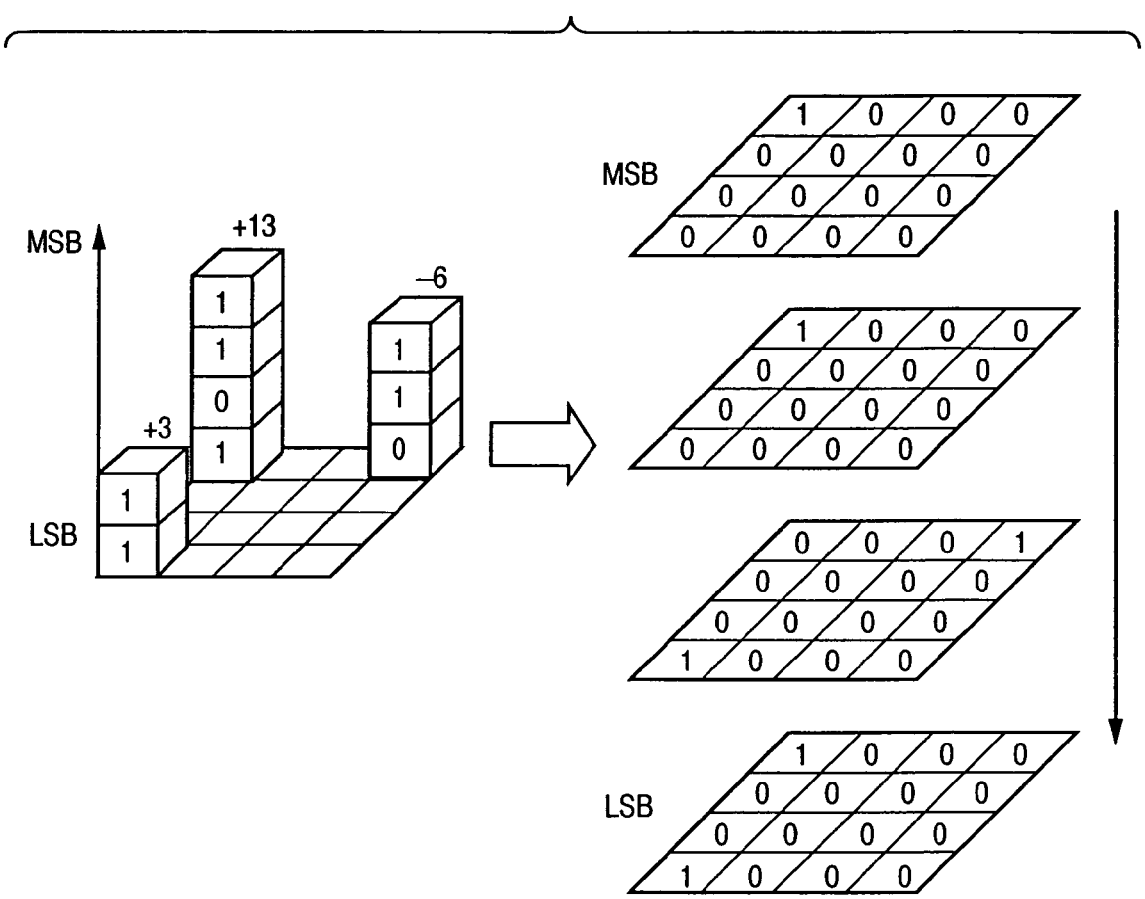
FIG. 13 is a diagram illustrating a bit plane according to one embodiment of the present invention.

FIG. 13 is a diagram illustrating a bit plane according to one embodiment of the present invention, and more specifically, a block of coefficient values after quantification. For ease of explanation the diagram shows an example of a 4×4 block, but of course the present invention is not limited to such a configuration and may vary widely therefrom, and, in general, employs a block of a larger size than that shown here. If the coordinates are (i,j), then the diagram shows an example in which coordinates (1,1) have a coefficient of +13, (4,1) have a coefficient of −6, and (1,4) have a coefficient of +3, with all other coordinates having a coefficient of 0. Of these values, the largest is +13, and may be expressed in binary terms as 1101. That is, in the example shown, all the coefficients can be expressed in units of 4 bits, so the block can be adequately expressed if there are four planes, i.e., a bit 3 plane, a bit 2 plane, a bit 1 plane and a bit 0 plane, with each bit plane being encoded.

At the same time, viewed in terms of the importance of the data, the higher the bit the greater its importance, so, ultimately, the bit 3 plane controls the picture quality of that block, with the remaining planes, if listed in order of their impact on the picture quality, being the bit 2 plane, the bit 1 plane and the bit 0 plane. This means nothing other than that, when performing the wavelet transformation described above multiple times, the lowest frequency coefficient value (that is, the LL component) is the bit 3 plane, with the highest-frequency component coefficient aggregation {LH1+HL1+HH1} corresponding to the bit 0 plane.

As described above, according to the present embodiment, it is possible to eliminate the need to manage a plurality of keys for image data having a plurality of areas or a layered structure and which is encrypted using different encryption keys for each area and each layer of the structure. Moreover, it is possible to record decryption keys corresponding to each of the plurality of areas and layers and to correctly decrypt the image data.

Additionally, in the embodiment described above, the encryption processing unit 141, the access key generator 142 and the decryption processing unit 143 can each be implemented by an information processing apparatus such as a personal computer, in which case the steps used to implement these functions can be understood as a method invention. Moreover, since the present invention can be implemented by a computer, the scope of the present invention includes also the computer programs executed by each of those computers. Furthermore, since ordinarily the computer program is set or installed on a computer-readable storage medium such as a CD-ROM or the like or run from a system computer, such computer-readable storage medium is also within the scope of the present invention.

Additionally, although the present embodiment is described using an example in which the access control method combines the resolution and the precinct, the present invention is not limited to such a configuration but can instead employ access control by combining a variety of data units in JPEG2000.

For example, when combining layers and precincts, a "layer" may be substituted for the "resolution level". A layer is an aggregation of entropy encoded lines for decoding(decompressing) an image of a predetermined picture quality. Accordingly, aggregating layers and precincts to carry out the present invention makes possible access control keyed to picture quality and position (area), that is, a type of access control that enables high-resolution access to a predetermined position (area) within an image but only low-resolution access to the remaining positions (areas) of the image.

As another example, the resolution levels and the components can be combined. In such an instance, a "component" may be substituted for the "precinct" of FIGS. 4A and 4B. A component is an element that composes a pixel, and may for example be a brightness component or a color component. Accordingly, aggregating layers and components to carry out the present invention makes possible access control keyed to brightness and color component, that is, a type of access control that enables high-resolution access to the brightness component of an image but only low-resolution access to the color component of the image.

Similarly, as can be appreciated by those of skill in the art, it is also possible to combine layers and components.

According to an invention like that of the above-described present invention, one portion of an image that is a tile subject to wavelet transformation can be encrypted at or above a desired resolution level without the need to manage a plurality of encryption key data for that purpose.

It should be noted that although one distinctive feature of the present invention is the method of generating an encryption key for the purpose of controlling access at the level of the precinct unit in layer encoding, this distinctive feature is not limited to the instance described using FIGS. 5A and 5B. That is, a variety of variations for being able to control access effectively at the level of the precinct unit are possible.

Figure 17:
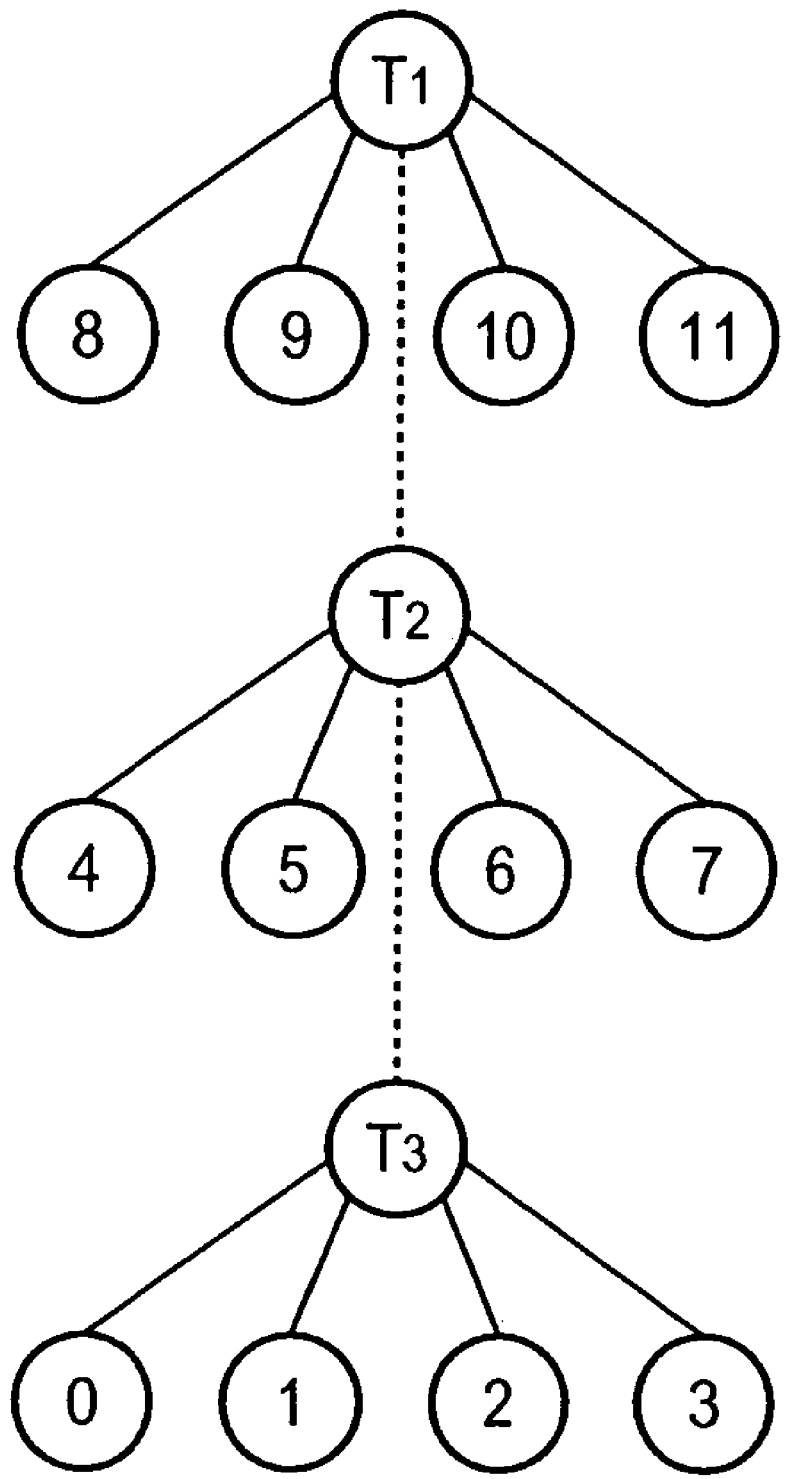
FIG. 17 shows a modified example according to FIG. 5A.

FIG. 17 shows a variation of FIG. 5A. Tile parts 0-11 in the diagram are the same as in FIG. 5A. Here, a tile key T1 belonging to the highest resolution level (that is, tile parts 8-11) is generated based on the tile key T. It should be noted that this T1 may be a value calculated using a unidirectional coefficient of T or it may be T itself. Next, T2 is generated by calculations using a unidirectional coefficient of T1. This T2 is the tile key belonging to the second highest resolution level (that is, tile parts 4-7). Next, T3 is generated by calculations using a unidirectional coefficient of T2. This T3 is the tile key belonging to the third highest resolution level (that is, tile parts 0-3).

The function of the tile keys T1-T3 is the same as that of nodes 11, 7 and 3 of FIGS. 5A and 5B, respectively. In FIGS. 5A and 5B, these three nodes fulfilled the function of representing the tile parts of the resolution levels. However, in FIG. 17, this representational function is given to other hypothetical nodes (T1, T2, T3). By so doing, each of the keys corresponding to these three nodes 11, 7 and 3 are produced the same as other tile parts in the resolution levels to which they belong, thus making identification and control of the nodes simpler.

Next, the encryption key for the tile parts 8, 9, 10 and 11 of the highest resolution level (that is, 44 in FIG. 4A) is generated using the tile key T1 and the respective tile part indexes (8, 9, 10 and 11). This is the same as FIGS. 5A and 5B. What is different from FIGS. 5A and 5B is that the tile part 11 key is also produced the same as the tile parts 8-10. Next, the encryption key for the tile parts 4-7 of the second highest resolution level (43 in FIG. 4A) is generated using the tile key T2 and the respective tile part indexes. Finally, the encryption key for the tile parts 0-3 of the third resolution level (42 in FIG. 4A) is generated using the tile key T3 and the respective tile part indexes. The above-described variations may also be adapted to the present invention and can provide highly efficient access control at the precinct unit level.

It should be noted that, although the foregoing description uses a JPEG2000 encoding algorithm, the present invention is not limited to such an instance. That is, the present invention can also be adapted to an encoding algorithm having a concept similar to that of the various types described above. Moreover, embodiments having different names from those described above (precinct, tile part, etc.), provided they operate on the same principle as that described above, are also within the scope of the present invention.

As many apparently widely different embodiments of the present invention can be made without departing from the spirit and scope thereof, it is to be understood that the invention is not limited to the specific preferred embodiments described above thereof except as defined in the claims.

What is claimed is:

1. An information processing method for encrypting encoded data generated by multi-stage wavelet transformation of image data, the method comprising the steps of:
dividing sub-bands of a plurality of resolution levels in the encoded data into a plurality of rectangular regions;
defining a plurality of groups, wherein each group includes an aggregation of encoded data of a plurality of rectangular regions having a same position in two-dimensional space of sub-bands of a same resolution level;
defining a tree structure that includes a plurality of nodes corresponding to the groups, where each node of the plurality of nodes is classified according to a first criterion of position in two-dimensional space and a second criterion of resolution level, and where nodes, from among the plurality of nodes, classified according to the first criterion are positioned according to the second criterion such that higher-resolution nodes are positioned above lower-resolution nodes;
determining whether each node is arranged in accordance with either the first criterion or the second criterion:
generating node keys corresponding to respective ones of the plurality of nodes in the tree structure in order from a highest node to a lowest node, using an encryption key assigned to the highest node, wherein the node keys for each node classified according to the first criterion determined in said determining step are generated based on a one-way function to which an encryption key assigned to a higher node than the node in question and information associated with a corresponding rectangular region are used as arguments, while node keys for each node classified according to the second criterion determined in said determining step are generated based on the one-way function to which an encryption key assigned to the higher node than the node in question is used as an argument;
encrypting each group of each node using a corresponding generated node key; and
outputting information associated with the generation of the node keys for each of the groups,
wherein the information outputted in said outputting step includes information indicating whether node keys for each node are generated based on the one-way function to which an encryption key assigned to the higher node than the respective node in question and information associated with a corresponding rectangular region are used, or based on the one-way function to which an encryption key assigned to the higher node than the node in question is used.

2. The information processing method of claim 1, further comprising the step of transmitting route key information to a predetermined verification apparatus.

3. The information processing method according to claim 1, wherein the encoded data is encoded using a JPEG2000 encoding algorithm.

4. An information processing apparatus for encrypting encoded data generated by multi-stage wavelet transformation of image data, the apparatus comprising:
a unit for dividing sub-bands of a plurality of resolution levels in the encoded data into a plurality of rectangular regions;
a unit for defining a plurality of groups, wherein each group includes an aggregation of encoded data of a plurality of rectangular regions having a same position in two-dimensional space of sub-bands of a same resolution level;
a unit for defining a tree structure that includes a plurality of nodes corresponding to the plurality of groups, wherein each node of the plurality of nodes is classified according to a first criterion of position in two-dimensional space and a second criterion of resolution level, and wherein nodes, from among the plurality of nodes, classified according to the first criterion are positioned according to the second criterion such that higher-resolution nodes are positioned above lower-resolution nodes;

a unit for determining whether each node is arranged in accordance with either the first criterion or the second criterion;

a unit for generating node keys corresponding to respective ones of the plurality of nodes in the tree structure in order from a highest node to a lowest node, using an encryption key assigned to the highest node, wherein the node keys for each node classified according to the first criterion determined by said determining unit are generated based on a one-way function to which an encryption key assigned to a higher node than the node in question and information associated with a corresponding rectangular region are used as arguments, while node keys for each node classified according to the second criterion determined in said determining step are generated based on the one-way function to which an encryption key assigned to the higher node than the node in question is used as an argument;

a unit for encrypting each group of each node using a corresponding generated node key; and a unit for outputting information associated with generation of the node keys for each group, wherein the information outputted by said outputting unit includes information indicating whether node keys for each node are generated based on the one-way function to which an encryption key assigned to the higher node than the node in question and information associated with a corresponding rectangular region are used, or based on the one-way function to which an encryption key assigned to the higher node than the node in question is used.

5. An information processing apparatus for generating a decryption key for decrypting encrypted-encoded image data encoded by performing a multi-stage wavelet transformation process, the apparatus comprising:

a unit for dividing sub-bands of a plurality of resolution levels in the encoded data into a plurality of rectangular regions;

a unit for defining a plurality of groups, wherein each group includes an aggregation of encoded data of a plurality of rectangular regions having a same position in two-dimensional space of sub-bands of a same resolution level;

a unit for defining a tree structure including a plurality of nodes corresponding to the plurality of groups, wherein each node of the plurality of nodes is classified according to a first criterion of position in two-dimensional space and a second criterion of resolution level, wherein nodes, from among the plurality of nodes, classified according to the first criterion are positioned according to the second criterion such that higher-resolution nodes are positioned above lower-resolution nodes, and wherein nodes are sorted according to the first criterion;

a unit for determining whether each node is arranged in accordance with either the first criterion or the second criterion;

a unit for obtaining a decryption key for a predetermined node;

a unit for obtaining information, associated with key generation, added to encrypted groups in the encoded data; and a unit for generating node keys corresponding to respective ones of the plurality of nodes in the tree structure in order from a node corresponding to an obtained decryption key to a lowest node, using the decryption key, wherein the node keys for each node classified according to the first criterion determined by said determining unit are generated based on a decryption key assigned to the node corresponding to the obtained decryption key, information associated with a corresponding rectangular region, and a one-way function, and wherein a node key corresponding a node of interest is generated based on a generated node key of a node at a higher position than the node of interest and the one-way function.

6. An information processing method for encrypting encoded data generated by multi-stage wavelet transformation of image data, the method comprising the steps of:

dividing sub-bands of each resolution level in the encoded data into a plurality of rectangular regions;

defining a plurality of groups, wherein each group includes an aggregation of encoded data of a plurality of rectangular regions having the same position in two-dimensional space of the sub-bands of the same resolution level;

defining a tree structure that includes a plurality of nodes corresponding to the plurality of groups, wherein each node of the plurality of nodes is classified according to a first criterion of resolution level and a second criterion of position in two-dimensional space, and wherein nodes, from among the plurality of nodes, classified according to the first criterion are positioned according to the second criterion;

determining whether each node is arranged in accordance with either the first criterion or the second criterion;

generating a node key corresponding to a respective one of the plurality of nodes in the tree structure in order from a highest node to a lowest node, using an encryption key assigned to the highest node, wherein the node keys for each node classified according to the first criterion determined in said determining step are generated based on a one-way function to which a key assigned to a node at higher position than the node in question is used as an argument, while node keys for each node are classified according to the second criterion determined in said determining step are generated based on the one-way function to which an encryption key assigned to the higher position than the node in question and information associated with a rectangular region of the node in question are used as arguments;

encrypting each group of each node using a corresponding generated node key; and outputting information associated to the generation of the node keys for each of the groups, wherein the information outputted in said outputting step includes information indicating whether node keys for each node are generated based on the one-way function to which an encryption key assigned to the higher node than the node in question and information associated with a corresponding rectangular region are used, or based on the one-way function to which an encryption key assigned to the higher node than the node in question is used.

7. An information processing apparatus for encrypting encoded data generated by multi-stage wavelet transformation of image data, the apparatus comprising:

a unit for dividing sub-bands of a plurality of resolution levels in the encoded data into a plurality of rectangular regions;

a unit for defining a plurality of groups, wherein each group includes an aggregation of encoded data of a plurality of rectangular regions having a same position in two-dimensional space of sub-bands of a same resolution level;

a unit for defining a tree structure including a plurality of nodes corresponding to the plurality of groups, wherein each node of the plurality of nodes is classified according to a first criterion of resolution level and a second criterion of position in two-dimensional space, and wherein nodes, from among the plurality of nodes, classified according to the first criterion are positioned according to the second criterion;

a unit for determining whether each node is arranged in accordance with either the first criterion or the second criterion;

a unit for generating node keys corresponding to respective ones of the plurality of nodes in the tree structure in order from a highest node to a lowest node, using an encryption key assigned to the highest node, wherein the node keys for each node classified according to the first criterion determined by said determining unit are generated based on a one-way function to which a key assigned to a node at higher position than the node in question is used as an argument, while node keys for each node are classified according to the second criterion determined in said determining step are generated based on the one-way function to which an encryption key assigned to the higher position than the node in question and information associated with a rectangular region of each determined node are used as arguments;

a unit for encrypting each group of each node using a corresponding generated node key; and a unit for outputting information associated with generation of the node keys for each group, wherein the information outputted by said outputting unit includes information indicating whether node keys for each node are generated based on the one-way function to which an encryption key assigned to the higher node than the node in question and information associated with a corresponding rectangular region are used, or based on the one-way function to which an encryption key assigned to the higher node than the node in question is used.

* * * * *